United States Patent [19]
Wakabayashi et al.

[11] Patent Number: 5,570,149
[45] Date of Patent: Oct. 29, 1996

[54] CAMERA HAVING A COLLAPSIBLE MOUNT TYPE PHOTOGRAPHIC OPTICAL SYSTEM

[75] Inventors: Hiroshi Wakabayashi, Yokohama; Hidenori Miyamoto, Urayasu; Minoru Kato, Kawasaki; Isao Soshi, Tokyo; Junichi Omi, Kawasaki, all of Japan

[73] Assignee: Nikon Corporation, Tokyo, Japan

[21] Appl. No.: 352,823

[22] Filed: Dec. 2, 1994

Related U.S. Application Data

[63] Continuation-in-part of Ser. No. 274,713, Jul. 18, 1994, abandoned.

[30] Foreign Application Priority Data

| Jul. 16, 1993 | [JP] | Japan | 5-199026 |
| Dec. 2, 1993 | [JP] | Japan | 5-302531 |
| Dec. 2, 1993 | [JP] | Japan | 5-302532 |
| Dec. 2, 1993 | [JP] | Japan | 5-302533 |
| Dec. 2, 1993 | [JP] | Japan | 5-302534 |

[51] Int. Cl.$^6$ ................................. G03B 17/04
[52] U.S. Cl. ................ 396/85; 396/349; 396/175
[58] Field of Search ................. 354/187, 149.1

[56] References Cited

U.S. PATENT DOCUMENTS

| 4,261,658 | 4/1981 | Uchiyama et al. | 354/126 |
| 5,083,146 | 1/1992 | Ueda. | |

*Primary Examiner*—Monroe H. Hayes

[57] ABSTRACT

A camera having a photographic optical system contained in a lens barrel including a zoom cam tube and a collapsible mount cam tube. The zoom cam tube is movable in a focal length adjustment region between a Tele position and a Wide position, while the collapsible mount cam tube is movable in a collapsible mount movement region between the Wide position and a fully collapsed position. During focal length adjustment action, a gear which transmits a drive force of a motor is in engagement with a first rack on the zoom cam tube, and only the zoom cam tube rotates. Due to this rotation, a cam portion is rotated via other gears meshed with the first rack, and a pair of viewfinder lenses and a light generating unit, are made movable. During collapsible mount action, the gear is in engagement with a second rack, only the collapsible mount cam tube is rotated, and the drive force of the motor is not transmitted to the cam portion.

18 Claims, 13 Drawing Sheets

CAMERA HAVING A COLLAPSIBLE MOUNT TYPE PHOTOGRAPHIC OPTICAL SYSTEM

CROSS-REFERENCE TO RELATED APPLICATION

This application is a continuation-in-part of U.S. application No. 08/274,713, filed on Jul. 18, 1994, now abandoned.

BACKGROUND OF THE INVENTION

1. Field of the Invention

The present invention relates to a camera having a collapsible mount type photographic optical system and, more particularly, to a zoom camera having a zoom function in which a lens barrel is pulled out and used during photography, and the lens barrel is pushed in and becomes shorter when not in use.

The present invention also relates to a collapsible mount type camera which can change photographic enlargement of a photograph and, in addition, can also change the photographic enlargement of a viewfinder. In particular, it relates to a collapsible type zoom camera having a lens which is closest to the subject and which is movable to a collapsible position received within the camera body and to a lowest magnification position, in which photography is possible. At the position of lowest magnification (a Wide position), the lens is moved closer to the subject than the collapsed position, and the lens is still further movable to a maximum magnification position (a Tele position), which is closer yet to the subject than the lowest magnification position.

2. Description of the Related Art

Cameras are known in the prior art in which a displacement action (when the focal length of the camera is changed to adjust magnification) and a collapsible mount action (when a lens barrel is shortened for periods of non-use) of the photographic optical system are coupled using a cam tube and the like. These types of cameras also have a viewfinder lens and/or light generating unit (strobe), which function as photographic auxiliary units. To achieve a better photograph, it is necessary to change the respective viewfinder magnification or illuminating angle of the light generating unit according to the magnification of the photographic optical system. The variable motions of the photographic auxiliary units are performed by transmitting a rotation of the cam tube and the like via a reduction gear to the photographic auxiliary units.

FIG. 13 is an oblique view showing an embodiment of a prior art camera having a collapsible mount type photographic optical system. As shown in FIG. 13, a motor 52 acting as a drive unit, and gears 53, 54, and 55 acting as a drive force transmission unit, are arranged in a camera 50. The gear 55 is in engagement with a rack portion 56 formed along a circumference of the external circumferential portion of an outer tube 51a of a lens barrel 51.

When the motor 52 rotates, the outer tube 51a of the lens barrel 51 is rotated. Due to the rotation of the outer tube 51a, a photographic optical system (not shown in the drawing), which is disposed in the internal portion of the lens barrel 51, performs a focal length adjustment in order to adjust magnification, moving in a focal length adjustment region (a first region between a Wide position where the lens barrel is shortened and a Tele position where the lens barrel is lengthened) in a direction of an optical axis of the photographic optical system. The photographic optical system also performs a collapsible mount action, moving in a collapsible mount region (a second region between a collapsible mount position where the lens barrel is shortened with the camera being in a period of non-use and the Wide position) in the direction of the optical axis.

The rack portion 56 and engaged gears 57 and 58 are disposed in the camera 50. A gear 58 is in engagement with a gear portion 59d formed in cam portion 59. Plural cam grooves 59a, 59b and 59c are formed in the cam portion 59. Support shafts 61a and 62a of respective viewfinder variable power lenses 61 and 62 and the support shaft 63a of the light generating unit 63, respectively cooperate with the cam grooves 59a, 59b and 59c.

The cam grooves 59a, 59b and 59c have groove portions 59a-1, 59b-1 and 59c-1 in which the respective support shafts 61a, 62a and 63a slide during focal length adjustment (zoom) operation, and groove portions 59a-2, 59b-2 and 59c-2 in which the support shafts 61a, 62a and 63a slide during collapsible mount action of the photographic optical system.

The rotation of the lens barrel 51 is transmitted to the cam portion 59 by means of the rotation of the gears 57 and 58, and the cam portion 59 rotates with the support portion 60 as a fulcrum. Due to this rotation, the support shafts 61a and 62a of the view finder variable power lenses 61 and 62 move along the cam grooves 59a and 59b and, as a result, the viewfinder variable power lenses 61 and 62 move in a direction in which a guide spindle 64 extends, approaching or separating from the fixed viewfinder lenses 66 and 68 and the viewfinder frame 67. Moreover, through the movement of the support shaft 63a of the light generating unit 63 along the cam groove 59c, the light generating unit 63 moves in a direction in which guide spindle 65 extends.

In the prior art collapsible mount type camera of FIG. 13, because the structure couples the rotation of the lens barrel 51 and the rotation of the cam portion 59, the motion of variable power viewfinder lenses 61 and 62 and the light generating unit 63 are not limited to only the focal length adjustment action of the lens barrel 51, but are also linked to the collapsible mount action of the lens barrel 51. Accordingly, in the cam grooves 59a, 59b and 59c, a play region is necessary such that it corresponds to the collapsible mount action of the lens barrel 51. Namely, it is necessary to form the groove portions 59a-2, 59b-2 and 59c-2. Consequently, in order to form this region, the cam portion 59 has to be made large, having the result that the size of the camera is increased.

SUMMARY OF THE INVENTION

Accordingly, it is an object of the present invention to provide a camera having a collapsible mount type photographic optical system such that the size of the corresponding camera is minimized. During a time when the photographic optical system is in the collapsible mount region (when the lens barrel is between a position where it is shortest and the Wide position), photographic auxiliary units, such as a viewfinder and a strobe, can move with no play.

Additional objects and advantages of the invention will be set forth in part in the description which follows, and, in part, will be obvious from the description, or may be learned by practice of the invention.

Objects of the present invention are achieved by providing a camera equipped with a photographic optical system capable of movement in a focal length adjustment region, such that the focal length of the camera is changed to adjust magnification, and a collapsible mount movement region, such that a lens barrel containing the photographic optical system is shortened during non-use. A drive unit provides a drive force. A first movement unit moves the photographic optical system, and a second movement unit moves the photographic auxiliary unit, via the drive force of the drive unit. A drive force transmission unit transmits the drive force to the first and second movement units when the photographic optical system moves in the focal length adjustment region (a first region between a Wide position where the lens barrel is shortened and a Tele position where the lens barrel is lengthened) such that focal length adjustment is performed to adjust magnification for a photograph, and transmits the drive force to only the first movement unit when the photographic optical system moves in the collapsible mount movement region (a second region between a collapsible mount position where the lens barrel is shortened and the camera is in a period of non-use, and the Wide position).

The drive force is transmitted to the photographic auxiliary unit only when the photographic optical system moves in the focal length adjustment region. When the photographic optical system moves in the collapsible mount movement region, the drive force is not transmitted to the photographic auxiliary unit. Accordingly, it is not necessary to form a region corresponding to the collapsible mount action of the photographic optical system in the second movement unit, resulting in a movement unit having a small size.

The objects of the present invention are further achieved by a collapsible type zoom camera which can change a magnification of a photograph and, in addition, which can also change the magnification of the viewfinder accompanying changes of the photographic magnification. The collapsible type zoom camera comprises a lens barrel having a first lens group nearest the subject, the first lens group being able to move to a collapsed position within the body, and to a minimum magnification position (the Wide position), in which photography is possible, which is closer to the subject than at the collapsed position, and to a maximum magnification position (the Tele position), in which photography is possible, which is still further closer to the subject than the minimum magnification position.

The lens barrel has a lens support tube arranged for possible relative motion in a direction parallel to the optical axis with respect to a camera body, and to support the first lens group, a fixed tube which is arranged on the outer circumference of the lens support tube and which cannot move relative to the camera body, a collapsible mount cam tube which is arranged outside the fixed tube and whose rotation is possible relative to the optical axis with respect to the body, and a zoom cam tube which is arranged closer to the subject than the collapsible mount cam tube and is also on the outside of the fixed tube, and whose rotation is possible relative to the optical axis with respect to the camera body.

A follower projection is formed in the lens support tube and projects in a radial direction with respect to the optical axis. A rectilinear guide portion is formed in the fixed tube, and is able to cooperate with the follower projection, to move the first lens from the collapsed position to the position of maximum magnification (the Tele position), and also to guide the follower projection in a direction parallel to the optical axis.

Spiral cam grooves with respect to the optical axis are formed in the collapsible mount tube. There is possible cooperation of the first lens group with the follower projection from the collapsed position to just before the Wide position and, in addition, a first rack portion is formed extending in the circumferential direction in this outer circumference.

Also, second spiral cam grooves with respect to the optical axis are formed in the zoom cam tube, such that cooperation is possible of the follower projection for the first lens group, to move from the collapsed position to reach the Tele position and, in addition, a second rack position portion is formed extending in the circumferential direction in this outer circumference.

A cam tube drive gear engages with the rack portions of the zoom cam tube and the collapsible mount cam tube. A single drive source causes the cam tube drive gear to rotate, and a variable power gear engages only the rack portion of the aforementioned zoom cam tube. A variable power mechanism causes variable power operation in the view finder accompanying the rotation of the variable power gear. The collapsible mount cam tube rotates by a cam portion and the follower projection is coupled to the rectilinear guide portion of the fixed tube, to be able to cause the first lens group to move in a range from the collapsible position to at least a position as far as the one directly before the Wide position (the minimum magnification position). The rack portion of the collapsible mount cam tube is formed for possible cooperation with the cam tube drive gear.

The zoom cam tube rotates by the motion of the rack portion of the zoom cam tube and the follower projection cooperates with the rectilinear guide portion of the fixed tube. The first lens group can be moved in a range at least from the Wide position (the minimum magnification position) to the Tele position (the maximum magnification position), whereas cooperation is possible between the rack portion of the zoom cam tube and the cam tube drive gear.

Further, in the collapsible mount cam tube, engagement with the follower projection is possible between the collapsible mount position of the first lens group and immediately before reaching the Wide position. A spiral shaped cam is formed in the collapsible mount tube with respect to the optical axis. The film side portion of the zoom cam tube and the subject side of the collapsible mount tube are arranged such that they mutually overlap. In the zoom cam tube, in the interval in which the first lens group moves from the wide position to the Tele position, cooperates with the follower projection, and also a spiral shaped cam portion is formed with respect to the optical axis. A cam tube rotation mechanism, in the collapsible mount region, causes the collapsible cam mount cam tube to rotate. In addition, in the focal length adjustment region, the cam tube rotation mechanism causes the zoom cam tube to rotate. Further, a variable power mechanism causes variable power operation in the viewfinder accompanying only the rotation of the zoom cam tube.

In the collapsible mount cam tube, engagement with the follower projection is possible between the collapsible mount position of the first lens group and just before reaching the Wide position. The spiral shaped cam in the collapsible mount cam tube has a portion which is formed as a cam groove having a grooved bottom. The zoom cam cooperates with the follower projection in the interval where the first lens group moves in the focal length adjustment region. The spiral shaped cam portion formed in the zoom cam tube has a portion which is formed as a cam groove having a grooved bottom.

The cam tube rotation restricting mechanism is arranged such that as one cam tube rotates, the other cam tube is placed in a state of being stationary and the rotation angle phase displacement of both cam tubes can be prevented when the follower projection moves down from the one cam tube to the other cam tube.

In the collapsed state, the cam tube drive gear and the rack portion of the collapsible cam tube cooperate. Moreover, the follower projection formed in the lens support tube cooperates with the rectilinear guide portion of the fixed tube and with the cam portion of the collapsible mount cam tube. In the collapsible mount position, when the drive source is caused to drive, the cam tube drive gears rotate, and the collapsible mount cam tube rotates. When the collapsible cam robe rotates, because the position of the cams formed in this also changes, the follower projection which cooperates with this cam can move in a direction containing a component direction parallel to the optical axis. During this time, because the follower projection cooperates with the rectilinear guide portion of the fixed robe, it is guided in the rectilinear guide portion, and moves in a directional parallel to the optical axis.

The collapsible mount cam tube rotates, and when the first lens group reaches a point just before the Wide position, the follower projection which was cooperating with the cam portion of the collapsible mount cam tube moves perpendicularly to the cam portion of the zoom cam tube. Furthermore, the cam tube drive gear cooperates with the rack portion of the zoom cam tube. Because of this, by the rotation of the cam tube drive gear, the zoom cam rotates from the Wide position, and the first lens group is moved.

However, the variable power gear, because it cooperates only with the rack portion of the zoom cam tube, causes the zoom cam tube to rotate and performs a variable power operation in the focal length adjustment region. In other words, the viewfinder variable power mechanism operates by the rotation of the zoom cam tube alone and, furthermore, the variable power viewfinder, which operates by this variable power mechanism, does not operate in the collapsible mount region. Accordingly, the operating stroke of the movable portion of the viewfinder itself, and the operating stroke of the movable portion of the variable power mechanism of this viewfinder can be made short, and the camera body can be designed for a small size.

Moreover, generally, when the two cam tubes are individually caused to rotate, it is typical for the respective independent drive sources to be arranged. Nevertheless, in the camera of the present invention, rack portions are formed on the outer circumferences of the respective cam tubes. Also, in the state in which both cam tubes are caused to rotate, because the formation regions of the respective rack portions are fixed, one cam tube drive gear is caused to cooperate with these rack portions, and both cam tubes can be individually rotated. Accordingly, by having two cam tubes, a large size of the camera can be avoided.

Moreover, as noted, the cam tube is divided into two cam tubes, but because portions of the two tubes mutually overlap, a leakage of light accompanying the cam tube division can be avoided.

When a through cam, formed in the collapsible mount cam tube and the zoom cam tube, is formed which penetrates from the inside of the particular cam tube to the outside, the rigidity of the cam tube is reduced. When the follower projection has come into contact with the cam portion of the corresponding cam tube, the cam portion performs as a result, and the follower projection cannot be moved to an accurate position. Because of this, the collapsible mount type camera of the present invention, with at least one portion of the corresponding cam tube having been formed as a cam groove with a grooved bottom, the deformation of the cam portion can be kept to a minimum, and the follower projection can be moved to an accurate position.

Moreover, because there are two cam tubes, when the follower projection moves down to the cam portion of the zoom cam tube from the cam portion of the collapsible mount cam tube, it is important that the position of both cams meet at their end portions. Because of this, in the collapsible mount type camera of the present invention, the relative positional relationships and the direction of rotation of both cam tubes have to be maintained at this time. The rotation of one of the cam tubes is not necessary, and the rotation is restricted by the cam rotation restricting mechanism.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
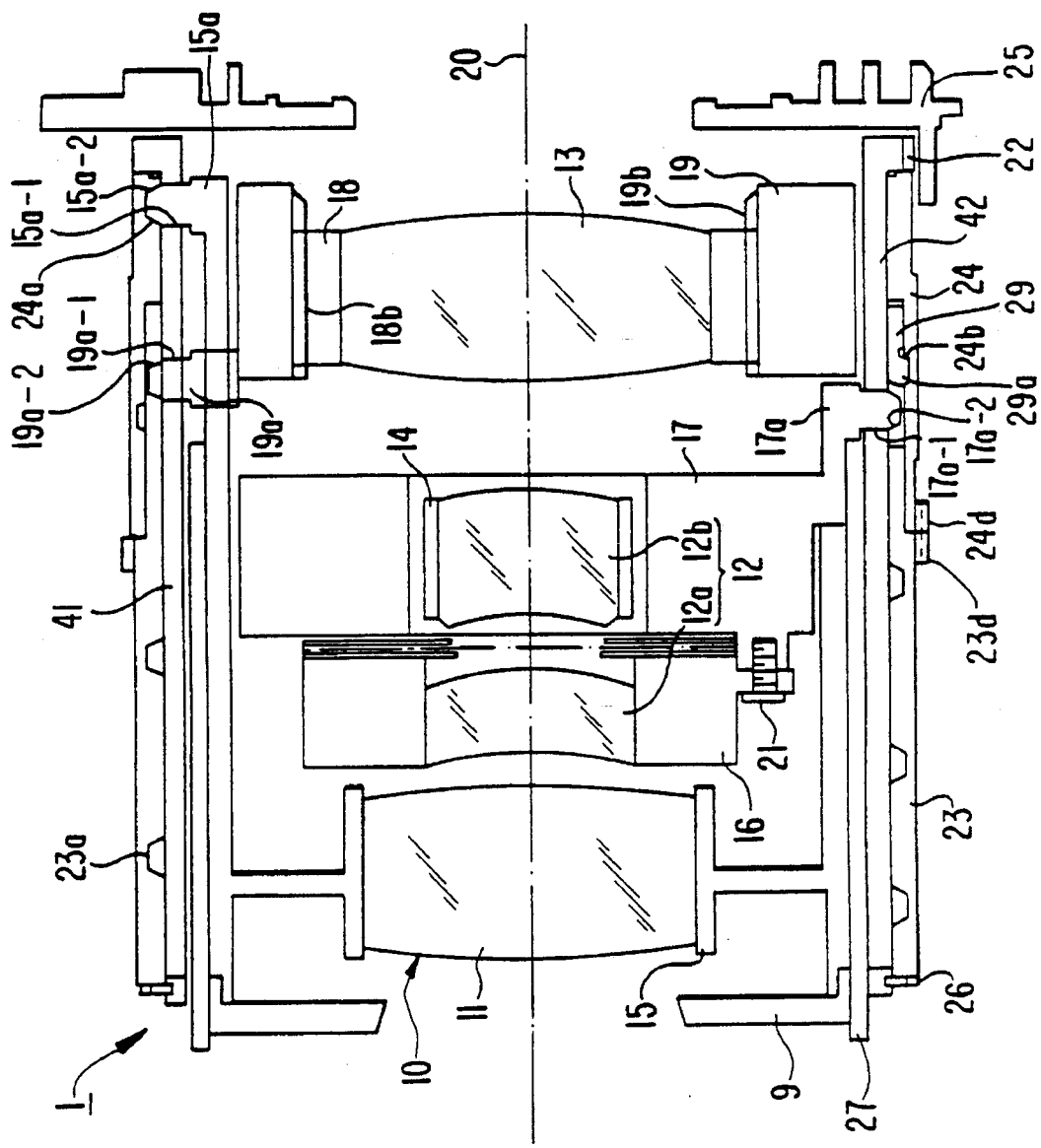
FIG. 1 is a cross sectional view showing a photographic optical system of a collapsible mount type zoom camera in a collapsed state according to an embodiment of the present invention.

Reference will now be made in detail to the present preferred embodiments of the present invention, examples of which are illustrated in the accompanying drawings, wherein like reference numerals referred to like elements throughout.

Figure 2:
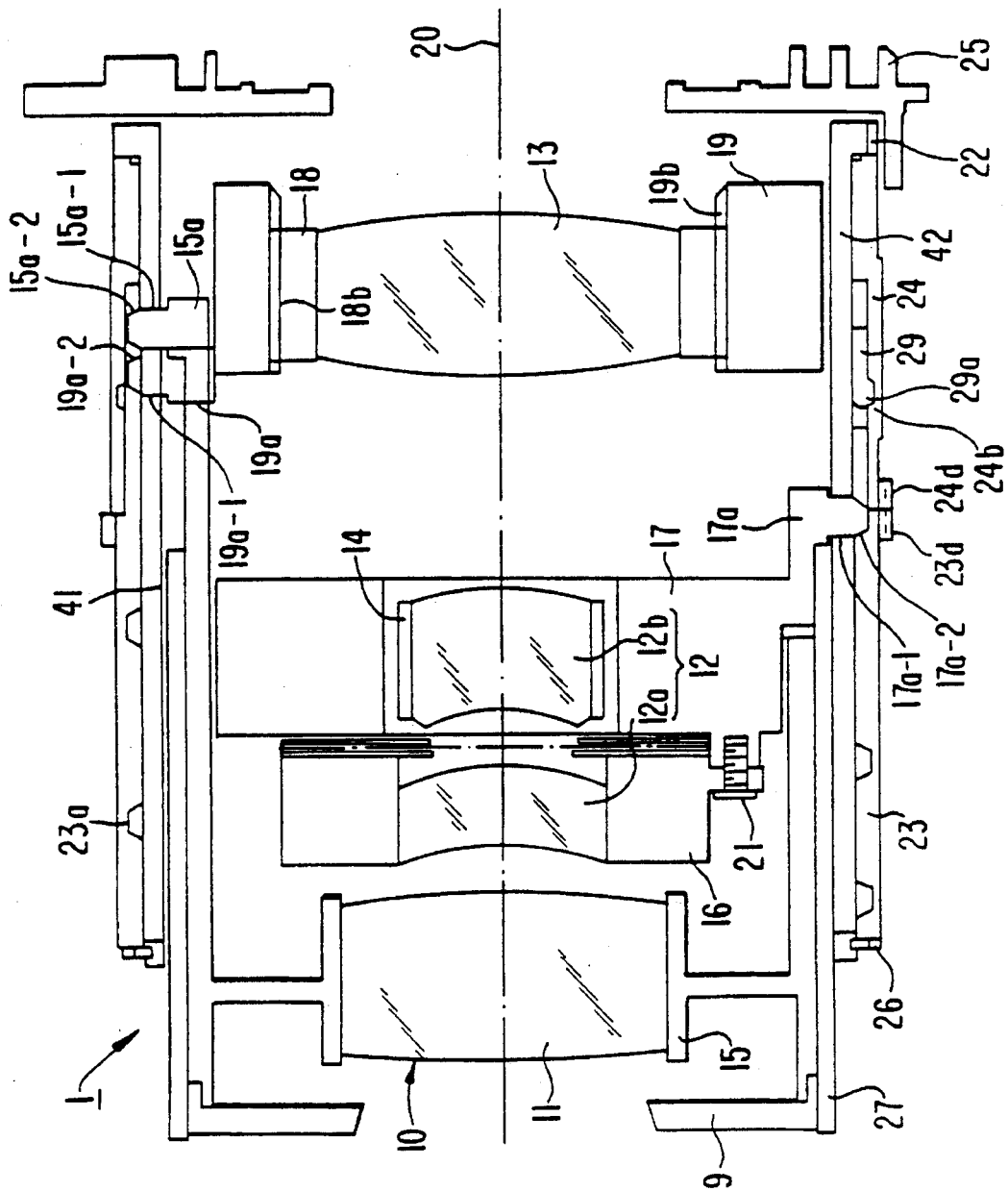
FIG. 2 is a cross sectional view showing when the photographic optical system has been shifted from the collapsed state of FIG. 1 to a Wide state.

FIGS. 1 and 2 are cross-sectional views showing a photographic optical system of a collapsible mount zoom camera according to an embodiment of the present invention. FIG. 1 shows a photographic optical system 10 in a fully collapsed state such that the camera is in a period of non-use, while FIG. 2 shows the photographic optical system 10 in a Wide state such that wide angle photography may take place.

In FIGS. 1 and 2, the photographic optical system 10 of a lens barrel 1 comprises a first lens group 11, a second lens group 12 including front and rear lens groups 12a and 12b, and a third lens group 13. The first lens group 11 is fixed in a tube 15. The front lens group 12a of the second lens group 12 is fixed in a shutter block 16. The shutter block 16 is fixed to an antivibration unit 17, such as by means of a screw 21.

The rear lens group 12b of the second lens group 12 is fixed in a lens compartment 14. The lens compartment 14 is movably supported by a mechanism, not shown in the drawing, for movement with respect to the anti-vibration unit 17 in a direction approximately perpendicular to the direction of optical axis 20. The third lens group 13 is fixed in a helicoid ring 18. A first helicoid 18b is formed in the helicoid ring 18, and cooperates with a second helicoid 19b formed in a focus unit 19. The focus unit 19 has in its lower portion a mechanism, not shown in the drawing, which actuates the helicoid ring 18.

A fixed tube 22 is fixed in camera body 25. A zoom cam tube 23 and a collapsible mount cam tube 24 are rotatably mounted on the external circumferential portion of the fixed tube 22, and are restrained by a ring 26 so that they do not move in the direction of the optical axis. Moreover, a light shielding tube 27 is fixed to the anti-vibration unit 17 and located between the tube 15 and the fixed tube 22. A front ring 9 is fixed to the tube 15.

Three follower pins 15a, 17a and 19a, projecting in a radial direction of the lens barrel 1, are respectively disposed on tube 15, anti-vibration unit 17, and focus unit 19. Respective cylindrical portions 15a-1, 17a-1 and 19a-1, and taper portions 15a-2, 17a-2 and 19a-2, are formed on the follower pins 15a, 17a and 19a.

The tube 15, anti-vibration unit 17, and focus unit 19 are movable, in the direction of the optical axis 20, by means of the respective follower pins 15a, 17a and 19a that fit and slide freely in a rectilinear groove 41, (total of 9 places) formed in the fixed tube 22. Moreover, the taper portions 15a-2, 17a-2 and 19a-2 of the respective follower pins 15a, 17a and 19a are retained in cam grooves 23a and 24a (9 places each) respectively formed in the zoom cam tube 23 and collapsible mount cam tube 24.

Accordingly, the tube 15, anti-vibration unit 17, and focus unit 19 are supported to be capable of movement in the direction of the optical axis by means of the relative rotation of the zoom cam tube 23, the collapsible mount cam tube 24, and the fixed tube 22.

Figure 3:
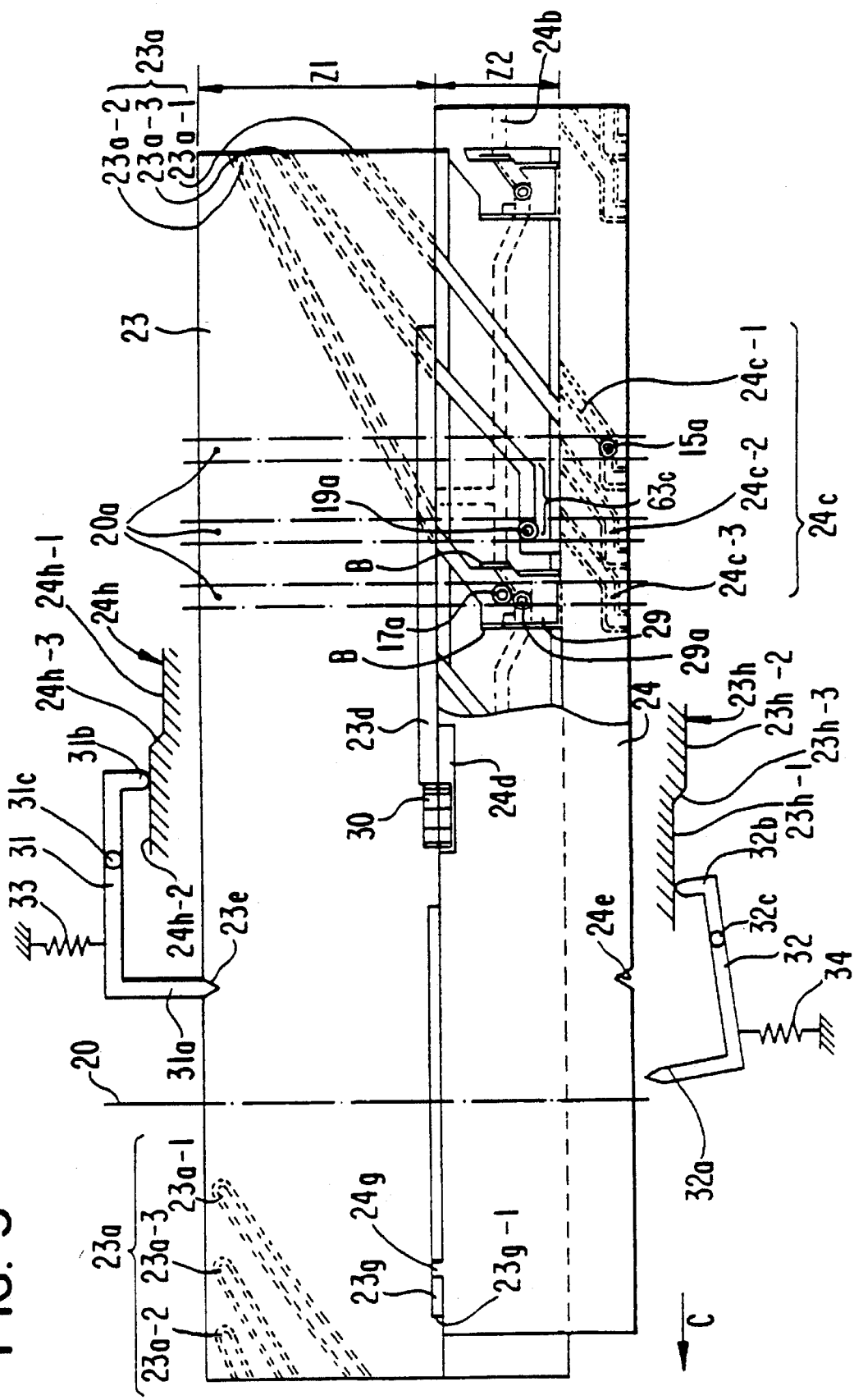
FIG. 3 is a developed diagram, seen from the outside, of a lens barrel in the collapsed state of FIG. 1.
Figure 4:
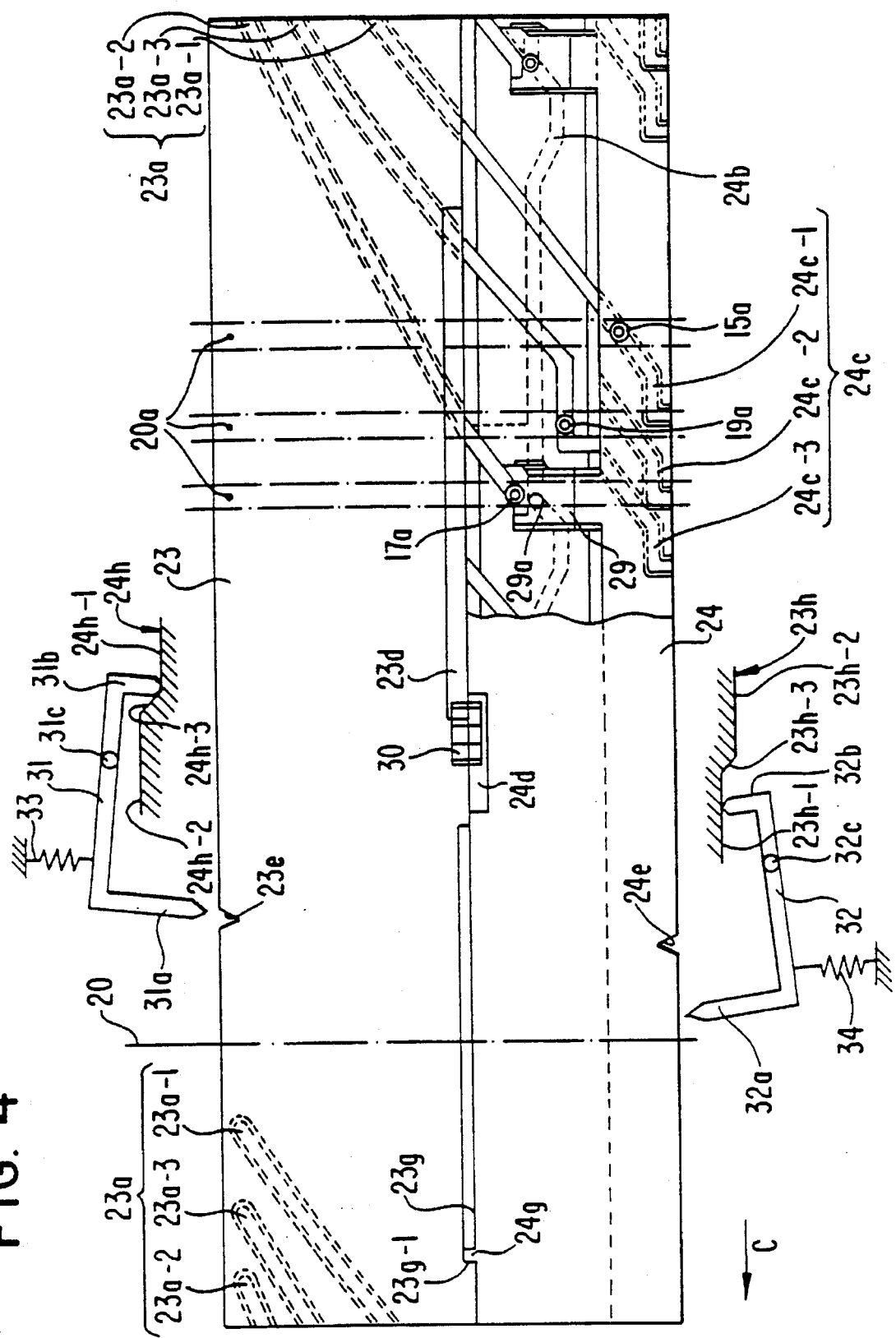
FIG. 4 is a developed diagram, seen from the outside, of the lens barrel during passage from the collapsed state of FIG. 3 to the Wide state.
Figure 5:
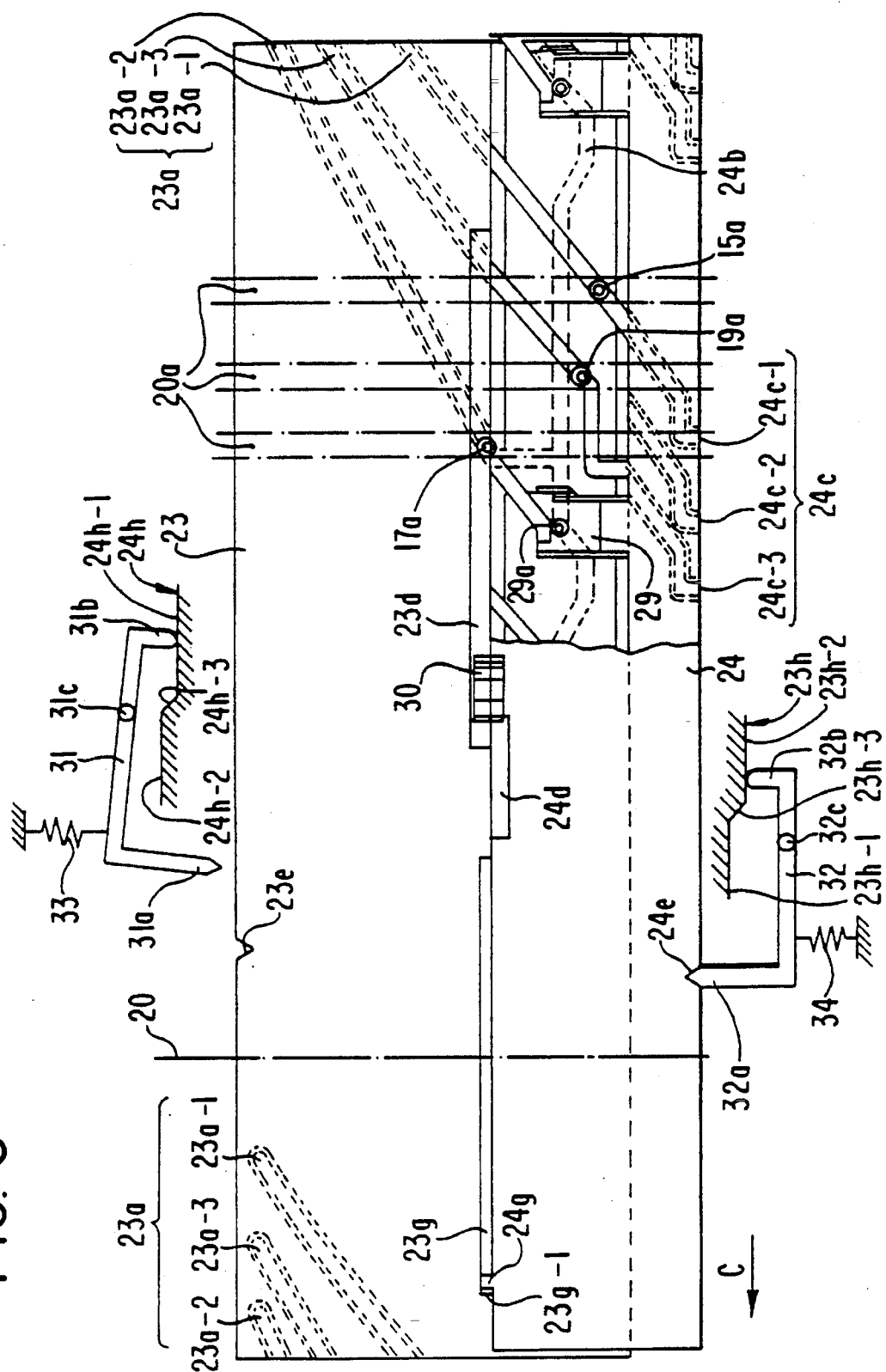
FIG. 5 is a developed diagram, seen from the outside, of the lens barrel which has reached the Wide state from the collapsed state of FIG. 3.

The arrangement of the zoom cam tube 23 and collapsible mount cam tube 24 will next be described in more detail. FIGS. 3–5, which are developed views of the lens barrel 1 seen from the exterior (partially including a perspective view), show the collapsible mount state in FIG. 3, the state during the transition from the collapsible mount state of FIG. 3 to the Wide state in FIG. 4, and the Wide state in FIG. 5.

In FIG. 3, cam grooves 23a formed in the zoom cam tube 23, which are formed in region Z1 as inner cams in the internal circumferential side of the zoom cam tube 23, are formed penetrating in region Z2. Each cam groove 23a includes three cam grooves, 23a-1, 23a-2 and 23a-3. FIG. 3 shows only the first respective cam grooves 23a-1, 23a-2 and 23a-3. Moreover, the other cam grooves 23a are equidistantly formed on a cylinder. The cam grooves 23a-1, 23a-2 and 23a-3 respectively cooperate with the follower pin 15a of tube 15, the follower pin 17a of the anti-vibration unit 17, and the follower pin 19a of the focus unit 19.

The cam groove 23a-3 has a partially flat portion 163c in the region Z2. Moreover, the lift piece 29 retained by the end portion of the cam groove 23a-2 has a slide surface B capable of sliding in the direction of the optical axis (the up and down direction in the Figure). The lift piece 29 has a follower pin 29a which cooperates with a lift groove 24b formed on the internal circumferential side of the collapsible mount cam tube 24 (see FIG. 1).

Collapsible mount grooves 24c, which include collapsible mount grooves 24c-1, 24c-2 and 24c-3, are formed in the collapsible mount cam tube 24. The collapsible mount grooves 24c-1, 24c-2 and 24c-3 respectively cooperate with the follower pin 15a of the tube 15, the follower pin 17a of the anti-vibration unit 17, and the follower pin 19a of the focus unit 19.

A drive gear 30 is disposed on the exterior of the lens barrel 1, to rotate in response to the drive force from a drive unit not shown in the drawing. The drive gear 30 is supported in a position to be in engagement with racks 23d and 24d disposed extending in a circumferential direction on the external circumference of the zoom cam tube 23 and of the collapsible mount cam tube 24, respectively.

A stop lever 31 is supported for free rotation on a shaft 31c used as a fulcrum, and has a stop portion 31a and an operative portion 31b. The stop portion 31a stops the rotation of the zoom cam tube 23 by cooperating with a groove 23e formed in the zoom cam tube 23. The operative portion 31b, due to the spring force of a spring 33 mounted on the stop lever 31, is placed in contact with the external circumferential surface 24h of the collapsible mount cam tube 24.

Here, as shown in FIG. 3, the external circumferential surface 24h of the collapsible mount cam tube 24 has a low surface portion 24h-1 and a high surface portion 24h-2; furthermore, an inclined surface portion 24h-3 is formed in these movable portions. When the operative portion 31b is in contact with the low surface portion 24h-1, the stop portion 31a is supported at a location separated from the zoom lens tube 23. Moreover, when the operative portion 31b is in contact with the high surface portion 24h-2, the stop portion 31a is in contact with the zoom cam tube 23, and becomes capable of cooperating with the groove 23e.

In a similar manner to the above, a stop lever 32, supported for free rotation by means of a shaft 32c, has a stop portion 32a to cooperate with a groove 24e formed in the collapsible mount cam tube 24, and an operative portion 32b which is placed in contact, by the spring force of a spring 34, with the external circumferential surface 23h of the zoom cam tube 23 (low surface portion 23h-1, high surface portion 23h-2, oblique surface portion 23h-3).

A portion 23g, offset in level, is formed extending in the circumferential direction in the zoom cam tube 23. A projecting portion 24g formed so as to project from one end of the collapsible mount cam tube 24 cooperates with the offset portion 23g. Relative rotation is limited by means of the offset portion 23g and the projecting portion 24g.

The action of the lens barrel 1 will next be described.

In FIG. 3, from this collapsible mount state, the drive gear 30 is rotated by a control unit, not shown in the drawing. The drive gear 30 is in engagement only with the rack portion 24d of the collapsible mount cam tube 24 (and is not in engagement with the rack portion 23d of the zoom cam tube 23). Moreover, in this state, the operative portion 31b of the stop lever 31 is placed in contact with the high surface portion 24h-2 of the external circumferential surface 24h of the collapsible mount cam tube 24. Because the stop portion 31a cooperates with the groove 23e of the zoom cam tube 23, the zoom cam tube 23 is prevented from rotating.

When the drive gear 30 is rotated, the collapsible mount cam tube 24 rotates in the direction C. Due to this rotation, the follower pins 15a and 19a respectively move along the collapsible mount groove 24c-1 and the cam groove 23a-3 in the direction 20a. Moreover, the follower pin 29a of the lift piece 29 moves in the upward direction, along the lift groove 24b. As a result, the lift piece 29 is pushed in an upward direction in the Figures, and the focus pin 17a is pushed in an upward direction by the lift piece 29.

Furthermore, when the collapsible mount cam tube 24 rotates in the direction C in FIGS. 3–5, the contact position of the operative portion 31b of the stop lever 31 moves from the high surface portion 24h-2 of the collapsible mount cam tube 24 to the oblique surface portion 24h-3, and further to the low surface portion 24h-1. Due to this, the stop lever 31, urged by the spring force of the spring 33, rotates in a clockwise direction, with the shaft 31c as a fulcrum, and the engaged state of the stop portion 31a with the groove 23e of the zoom lens cam tube 23 is released.

Directly after this, the projecting portion 24g of the collapsible mount cam tube 24 comes into contact with the one end 23g-1 of the offset portion 23g, and the zoom cam tube 23 begins to rotate integrally with the collapsible mount cam tube 24. By means of the above actions, the lens barrel 1 moves from the state of FIG. 3 to the state of FIG. 4.

When the zoom cam tube 23 rotates, the rack portion 23d of the zoom cam tube 23 comes into engagement with the drive gear 30. Moreover, the follower pin 15a moves out of cooperation with the collapsible mount groove 24c-1 and into cooperation with the cam groove 23a-1, and similarly, the follower pin 17a cooperates with the cam groove 23a-2.

When the zoom cam tube 23 and the collapsible mount cam tube 24 rotate further, the rack portion 24d of the collapsible mount cam tube 24 disconnects from the drive gear 30, and the engagement of the rack portion 24d and the drive gear 30 is released. Directly after this, the contact position of the operative portion 32b of the stop lever 32 moves from the low surface portion 23h-1 of the zoom cam tube 23 to the inclined surface portion 23h-3 and further to the high surface portion 23h-2. The stop portion 32a cooperates with the groove 24e of the collapsible mount cam tube 24, and the rotation of the collapsible mount cam tube 24 is stopped. After this, only the zoom cam tube 23 rotates, and the rotation of the drive gear 30 is stopped by the control portion at the Wide position. By means of the above actions, the lens barrel 1 moves from the state of FIG. 4 to the state of FIG. 5. Moreover, from the state of FIG. 1, the state becomes that of FIG. 2. The collapsible mount region is between the collapsible mount position (when the photographic optical system is at its shortest) and the Wide position (the position to take wide angle photographs).

In FIG. 5, from the Wide position, only the zoom cam tube 23 rotates, and the follower pins 15a, 17a and 19a move along in the direction 20a as far as the final end portion (the Tele position, which is the position for taking telephoto photographs) of the respective cam grooves 23a-1, 23a-2 and 23a-3. The focal length adjustment (zoom) region is between the Wide position and the Tele position.

Moreover, the action from the Tele position to the Wide position, and the action from the Wide position to the collapsible mount position, is performed by actions which are the reverse of the events shown in FIGS. 3–5. Thus, between the Wide position and the collapsible mount position, the follower pin 17a, moved away from the cam groove 23a-2, returns to the collapsible mount position due to the anti-vibration unit 17 being pushed down by the tube 15.

The focal length adjustment action of a view finder portion of a collapsible mount type camera equipped with the lens barrel 1 of the embodiment described above, and the action of changing the illumination angle of a light generating unit (strobe), will next be described.

Figure 6:
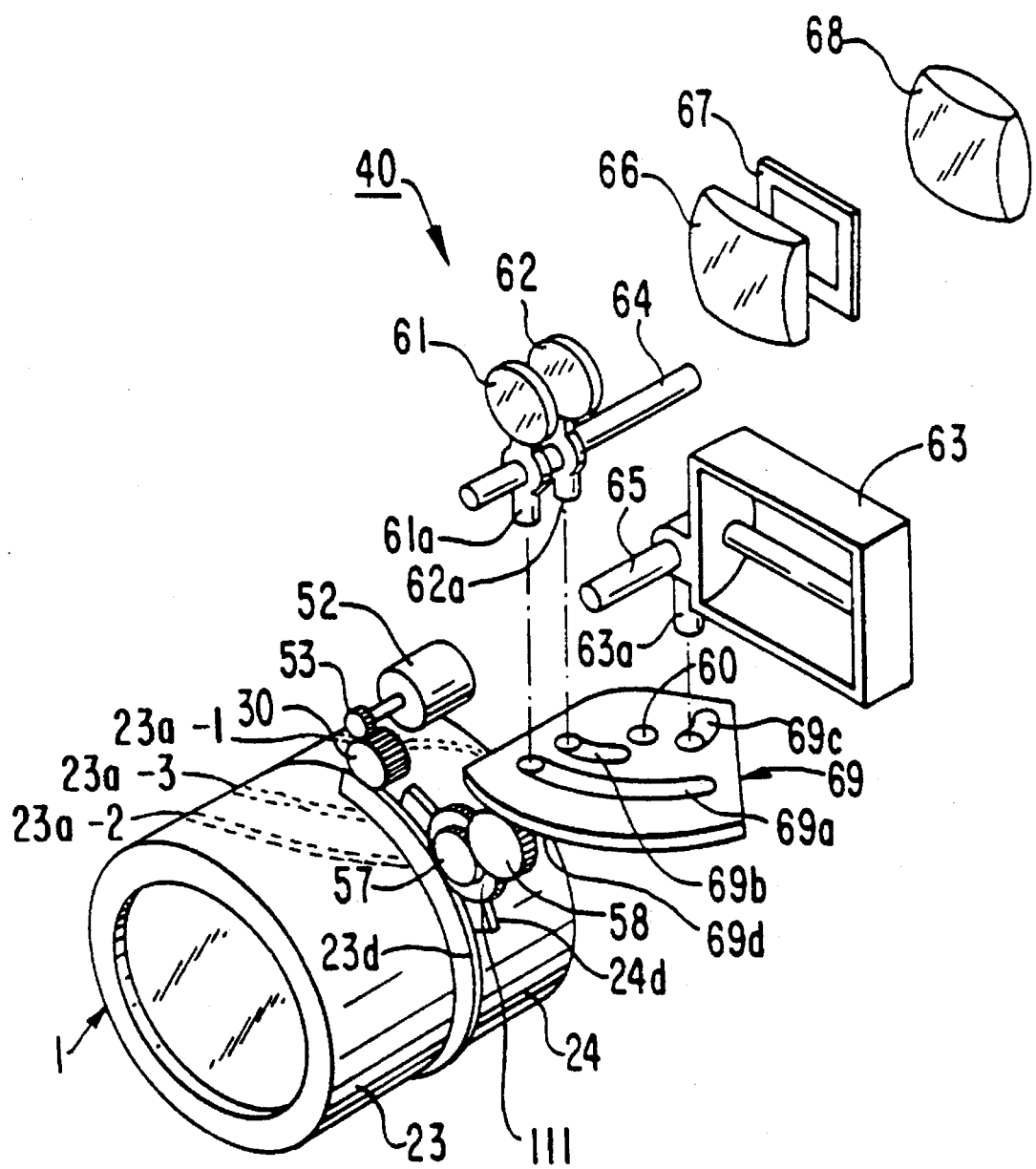
FIG. 6 is an oblique view of a collapsible mount type zoom camera according to the embodiment of the present invention shown in FIG. 1.

FIG. 6 is an oblique view showing a collapsible mount type zoom camera according to the embodiment of the present invention illustrated in FIG. 1, and shows the state in the Tele position. In FIG. 6, portions which are the same as in the camera of FIG. 7 have been given the same symbols, and duplicate descriptions are suitably omitted.

Figure 7:
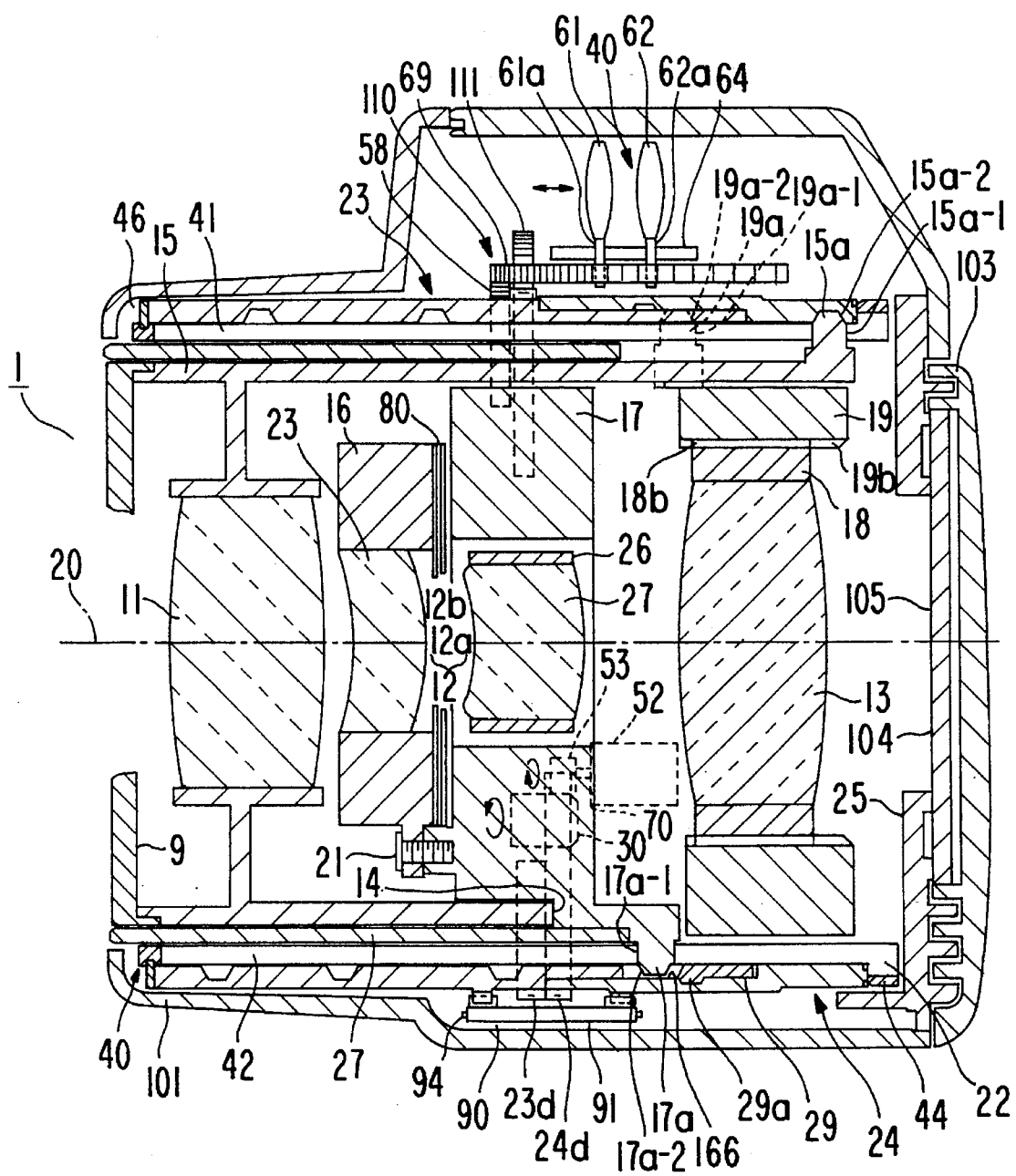
FIG. 7 is a more detailed cross sectional view of the collapsible mount type zoom camera of FIG. 1.

In FIG. 6, a member, cam portion 69 generally corresponding to the cam portion 59 of FIG. 7, is disposed in a camera 40. Cain grooves 69a, 69b and 69c are formed in the cam portion 69, respectively corresponding to the cam portions 59a-1, 59a-2 and 59a-3 of FIG. 7. Namely, these cam grooves 69a, 69b and 69c correspond only to the focal length adjustment action of the lens barrel 1, this action being performed when the lens barrel is between the Wide and Tele positions.

The gear 57 is in engagement with the rack portion 23d of the zoom cam tube 23, and is not in engagement with the rack portion 24d of the collapsible mount cam tube 24. Accordingly, only the rotation of the zoom cam tube 23 is transmitted to the cam portion 69 by means of the gears 57 and 58 and the gear portion 69d of the cam portion 69. As is clear from the abovementioned description, the zoom cam tube 23 rotates between the vicinity of the Wide position and the Tele position (the first region), and does not rotate between the collapsible mount position and the vicinity of the Wide position (the second region).

Accordingly, the cam portion 69 is rotated essentially between the Wide position and the Tele position, corresponding only to the focal length adjustment action of the lens barrel 1. Consequently, the viewfinder variable power lens portions 61 and 62, and the light generating unit 63, are movable only in the focal length adjustment (zoom) region. The variable power lens portions 61 and 62 of the viewfinder and the light generating unit 63 can be set to be stationary in the collapsible mount region. Accordingly, the photographic optical system 10 alone can be collapsed.

FIG. 7 is a more detailed cross-sectional view of the photographic optical system of the collapsible mount zoom camera shown in FIG. 1.

The first lens group 11, second lens group 12 including front and rear lens groups 12a and 12b and third lens group are contained within the lens barrel 1. The stop ring 9 is located in front of the first lens group 11 which is supported by the tube 15. The shutter block 16 has a shutter blind 80 and, in addition, supports the front lens group 12a of the second lens group 12. The anti-vibration unit 17 supports the rear lens group 12a of second lens group 12 with the lens compartment 14 having a lens supporting ring 14, and a helicoid ring 18 supports the third lens group 13. The focus unit 19 causes the helicoid ring 18 to rotate around the optical axis by moving in a direction parallel to the optical axis 20.

A fixed tube 22 is fixed to the camera body 25, and a light shielding tube 27 which shields the interval during relative movement of the tube 15 in a direction parallel to the optical axis 20 with respect to the anti-vibration unit 17. The zoom cam tube 23 and the collapsible mount cam tube 24 are arranged rotatably around the optical axis at the external circumference of the fixed tube 22. A cam tube rotation mechanism 70 causes rotation of the zoom cam tube 3 and the collapsible mount cam tube 24, and the lift piece 29 is arranged to be movable in a direction parallel to the optical axis 20 between the internal circumferential side of the fixed tube 22. Accompanying the rotation of either the zoom cam tube 23 or the collapsible mount cam tube 24 is a cam tube rotation restriction mechanism 90 which restricts the rotation of the other cam tube such that the other cam tube does not rotate.

The front ring 9 is fixed to the tube 15 so that it reduces the amount of light incident on the first lens group 11. The shutter block 16 is fixed to the anti-vibration unit 17 by the screw 21. The anti-vibration unit 17, in order to prevent so-called hand tremor, has a mechanism (not shown in the drawing) to cause motion in a direction at right angles with respect to the optical axis 20. The first helicoid 18b is formed on the external circumference of the helicoid ring 18 and the second helicoid 19b is formed in the internal circumference of the focusing unit 19, and the first helicoid 18b is screwed into it. The focusing unit 19 has a mechanism which causes movement in a direction parallel to the optical axis 20 when the helicoid 34 and the third lens group 13 are caused to rotate around the optical axis.

The follower pin 15a for use with the first lens group 11 is formed projecting in the radial direction (a direction perpendicular to the optical axis) on the side of the group tube 10 closest to the film of the camera. Moreover, the follower pin 17a for use with second lens group 12 is formed on the anti-vibration unit 17 and also, to the side closest to the film of the camera. Furthermore, the follower pin 19a for use with the third lens group 13 is also formed projecting in the radial direction on the side of the focus unit 30 closes to the subject being photographed. Cylindrical portions 15a-1, 17a-1 and 19a-1 are formed on the respective follower pins 15a, 17a and 19a, and taper portions 15a-2, 17a-2 and 19a-2 are formed on the respective follower pins 15a, 17a and 19a tip portions.

Figure 9:
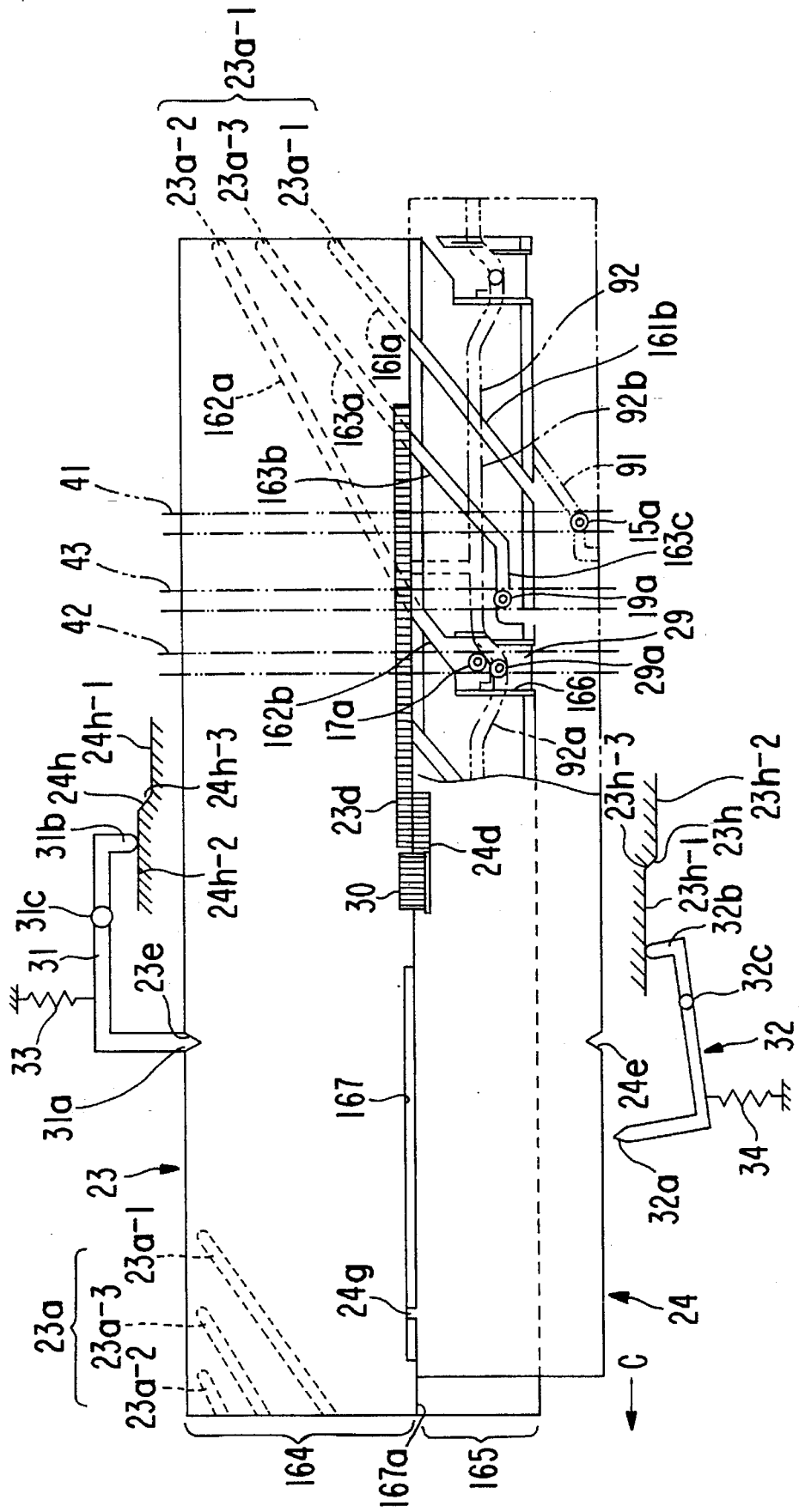
FIG. 9 is a developed diagram, seen from the outside, of a lens barrel and a collapsed state of FIG. 7.

In the fixed tube 22, as shown in FIGS. 7 and 9, rectilinear guide apertures 41, 42 and 43 are formed to guide the follower pins 15a, 17a and 19a, respectively, in a direction parallel to the optical axis 20. The corresponding follower pins 15a, 17a and 19a oscillate in the respective rectilinear guide apertures 41, 41, 43. Each follower pin 15a, 17a and 19a is in sliding contact at its respective cylindrical portion 15a-1, 17a-1 and 19a-1 with the inner surface of the respective rectilinear guide aperture 41, 42, 43. The taper portions 15a-2, 17a-2 and 19a-2 project to the external circumferential side of the fixed tube 40 from the rectilinear guide aperture 41, 42, 43. To regulate the movement of the zoom cam tube 23 and the collapsible cam tube 24 in a direction parallel to the optical axis 20, a flange 44 is formed on the fixed tube 2, projecting in an external circumferential direction on the film side end portion of the fixed tube 22, and a ring 46 is located on the subject side end portion of the fixed tube 22.

Figure 8:
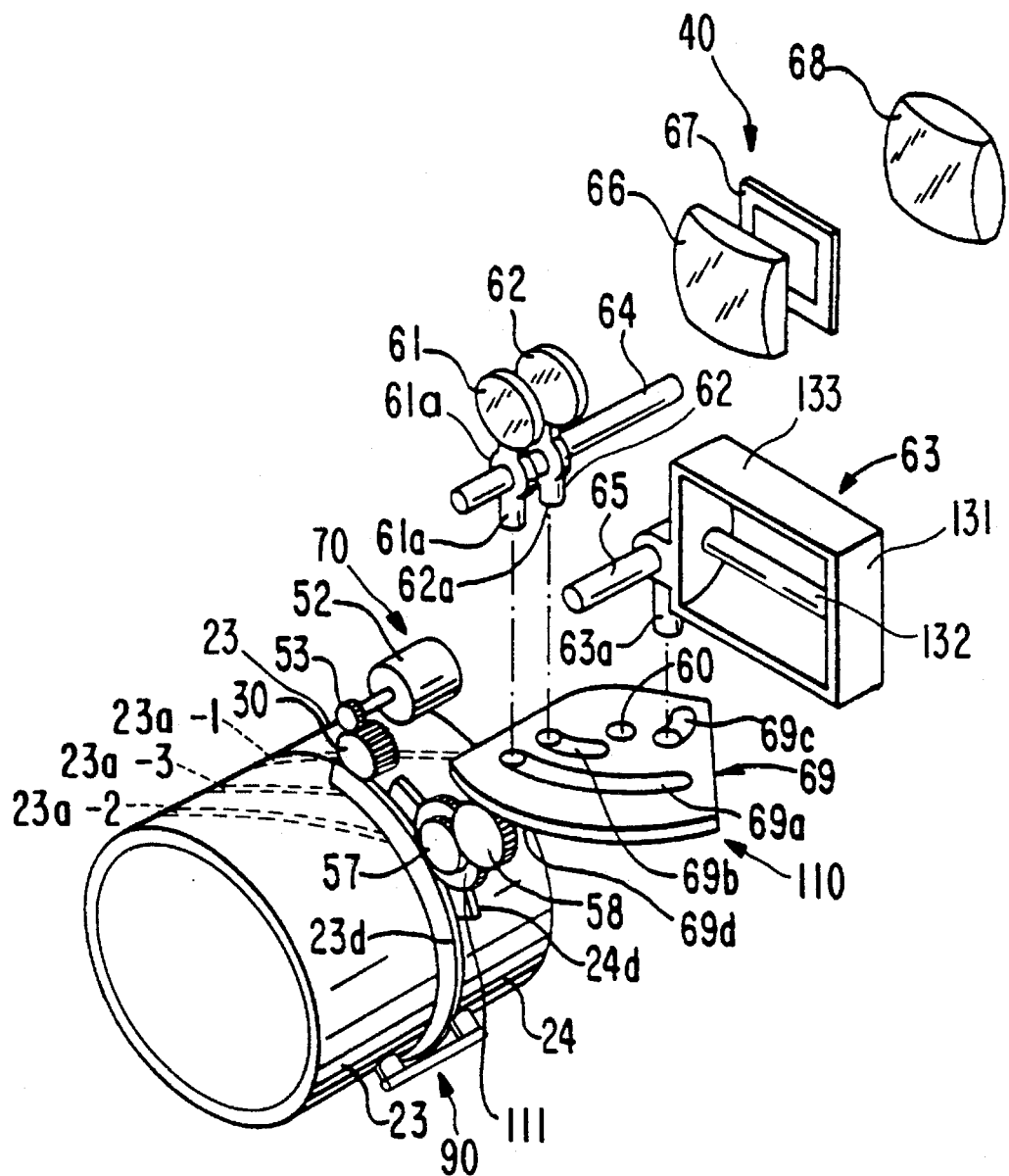
FIG. 8 is a more detailed oblique view of the collapsible mount type zoom camera shown in FIG. 6.

The zoom cam tube 23 has its film side plate thickness made thin. Moreover, the collapsible cam tube 24 has its subject side plate thickness made thin. When both the zoom cam tube 23 and the collapsible mount cam tube 24 have a plate thickness which has become thin, they mutually overlap. In the zoom cam tube 23 and the collapsible cam tube 24, as shown in FIGS. 7 and 8, there are formed cams 91, 23a-1, 23a-2 and 23a-3 which are cooperating with the taper portions 29b, 33b of the respective follower 15a, 17a and 19a. The cams 51, 23a-1, 23a-2 and 23a-3 are formed in a fundamental spiral with respect to the optical axis 20. As part of the cams 23a-1, 23a-2 and 23a-3 of the zoom cam tube 23, inner cams 161a, 162a, 163a are formed in the portion where its plate thickness is thick (the subject side portion=inner cam portion 164) (cams having groove bottoms formed on the inner circumferential side of the tube), and through cams 161b, 162b, 163b (cams penetrating from the internal circumferential side of the tube to the external circumferential side) are formed in its portion where the plate thickness is thin (film side portion=through cam portion 165). These internal cams 161a, 162a, 163a and through cams 161b, 162b, 163b, cooperate with respective follower pins 15a, 17a and 19a to form one respective cam 23a-1, 23a-2, 23a-3. The cam 23a-1 for first lens group 11 use is spirally formed from end to end with respect to the optical axis 20. Moreover, the cam 23a-3 is for third lens group 13 use. In its inner cam portion 164, completely extending in a spiral direction with respect to the optical axis 20, in through cam 165, the subject side extends in a spiral direction with respect to the optical axis 20, extends on the film side in a direction perpendicular to the optical axis 20. Moreover, the portion of cam 29a-3 extending in a perpendicular direction with respect to this optical axis 20 is a perpendicular portion 163c. The cam 23a-2 for second lens group 12, in the inner cam 164 and through cam 165, extends in a spiral direction with respect to the optical axis 20. However, the cam 23a-2 is formed only partially on the subject side. The lift piece 29 enters into the through cam 165 of the zoom cam tube 23, and a lift member receiving portion 166 is formed in order to cause the lift piece 29 to move in a direction parallel to the optical axis 20. This lift member receiving portion 166 is connected to the film side portion of the cam 23a-2. A follower pin 29a is formed to project in a radial direction with respect to the optical axis 20 in the lift piece 29. In the collapsible mount cam tube 24 are formed an inner cam 92 which cooperates with the follower pin 29a of the lift piece 29, and a cam 91 for first lens group 11 use and cooperating with the follower pin 15a. This inner cam 92 has a portion 92b which extends in a perpendicular direction with respect to the optical axis 20, and an oblique portion 92a which extends in an oblique direction with respect to the optical axis 20. A projecting portion 24g, projecting to the subject side, is formed in the subject side end of the collapsible mount cam tube 24. On the other hand, a notch 167 into which the projecting portion 24g of the collapsible mount cam 24 enters is formed in an offset portion 167a of altered thickness, of the zoom cam tube 23. This notch 167 and projecting portion 24g are in order to secure the relative rotation of the collapsible mount cam tube 24 and the zoom cam tube 23 on the one hand, and to secure the integral rotation of the collapsible mount cam tube 24 and the zoom cam tube 23 on the other hand. In the zoom cam tube 23, a rack portion 23d is formed, extending in the circumferential direction in the offset portion 167a, of altered thickness. Moreover, in the collapsible mount cam tube 24 there is also formed, in its circumferential side and also in the subject side end portion, a rack portion 24d which extends in a circumferential direction. The relative position of the two rack portions 23d and 24d in the circumferential direction will be described during the description of the operation of this embodiment.

On the external circumferential side of the zoom cam tube 23 and the collapsible mount cam tube 24, a drive gear 30 causes rotation of these tubes 23 and 24 around the optical axis, by cooperating with these rack portions 23d and 24d.

Another drive gear 53 engages the drive gear 30, and a drive motor 52 to cause the drive gear 72 to rotate. The cam tube mechanism 70 comprises the rack portions 23d and 24d, the drive gears 30 and 53, and the drive motor 52. On the external circumferential side of the zoom cam tube 23 and the collapsible mount cam tube 24, furthermore, when the projecting portion 24g of the collapsible cam tube 24 is not placed in contact with the end portion of the notch 167 of the zoom cam tube 23, and relative rotation of both cam tubes 23 and 24 is possible, with respect to the rotation of the cam tube on one side, the rotation restriction mechanism 90 is arranged such that the cam tube on the other side does not rotate to accompany this rotation.

The rotation restricting mechanism 90 is for zoom cam use to restrict the rotation of the zoom cam 23, and for collapsible mount cam use to restrict the rotation of the collapsible mount 24. The rotation restricting mechanism 90 comprises a pair of elements shaped like the character "]", such as stop levers 31 and 32, having stop portions 31a, 32a respectively formed at one end and operative portions 31b, 32b respectively formed at the other end. The portions 31a and 32a of the stop levers 31 and 32 cooperate with the grooves 23e and 24e, respectively, and when the rotation restricting cams 24h and 23h are placed in contact with the cam follower ends 31b and 32b of the rotation restricting levers 31 and 32, shafts 31c and 32c support the stop levers 31 and 32, respectively. The stop levers 31 and 32 perform identically to that described in FIG. 3. Moreover, in order to make the action of the rotation restricting mechanism 90 easily understood it has been drawn as FIG. 9, but in actuality, as shown in FIGS. 7 and 8, the stop lever 91 extends in a direction parallel to the optical axis 20 such as to extend over both cam tubes 23 and 24, its oscillation axis 9 also extends in a direction parallel to the optical axis 20. However, in these drawings, each of the stop levers 31 and 32 extend over only one side.

Moreover, only one of each of the following are drawn: the lift piece 29, lift piece receiving portion 166, the respective follower pins 15a, 17a and 19a of the members supporting the lens groups 11, 12a and 13, the cams 23a-1, 23a-2 and 23a-3 which cooperate with these pins 15a, 17a and 19a and 32, are drawn. However, in actuality, three of each of these elements are arranged in the camera. Moreover, there are three of each of the rectilinear guide aperture 41 for the first lens group 11, rectilinear guide aperture 42 for the second lens group 12, and the rectilinear guide aperture 43 for the third lens group 13, corresponding to the respective follower pins 15a, 17a and 19a.

The camera body 25, as shown in FIG. 7 has a rear portion, a body cover 101 which covers the base of the camera body 25 and the lens barrel 1, and a back cover 103 in order to load the film 105, and a pressure plate 104 to press the film against the camera body 25. Also, as shown in FIG. 8, variable power lens portions 61 and 62 and light generating unit 63 are shown, whereas a film windup mechanism and a film rewind mechanism, etc., are not shown.

The viewfinder has viewfinder variable power lens 61 and 62 which are movable with respect to the body cover 101, and a fixed viewfinder 66 which is fixed with respect to the body cover 101, and a viewfinder frame 124, and another fixed viewfinder lens 68. Moreover, the light generating unit 63 comprises a strobe body 131, and a Brinell lens (not shown in the drawing) located on the subject side of the strobe body 131. The strobe body 131 has a light generating body 132, with a strobe cover 133 covering this. A support shaft 63a is arranged in the strobe cover 133.

The operation will next be described of the collapsible type zoom camera of FIG. 7. As shown in FIGS. 7 and 9, in the collapsible mount region, the whole of the lens barrel device is received within the body cover 101. At this time, the follower pins 15a, 17a and 19a, respectively, are maximally positioned towards the film. Specifically, as shown in FIG. 9, the follower pin 15a is positioned on the side closest to the film of the cam 91 formed in the collapsible mount cam tube 50. The follower pin 17a is positioned within the lift piece receiving portion 166 formed in the zoom cam tube 23. The follower pin 19a is positioned in the perpendicular portion 163c of the cam groove 23a-3 formed in the zoom cam tube 23. Moreover, the lift piece 29 is positioned on the side closes to the film within the lift member receiving portion 166 of the zoom cam tube 23. The lift piece 29 contacts, at its side subject side end surface, the taper portion 17a-2 of the follower pin 17a. Moreover, the drive gear 30 cooperates only with the rack portion 24d formed in the external circumference of the collapsible mount cam tube 24, and does not cooperate with the rack portion 23d formed in the external circumference of the zoom cam tube 23.

Moreover, the stop portion 32a of the stop lever 32 is not situated in the groove 24e of the collapsible mount tube 24, but the stop portion 31a of the stop lever 31, is situated in the groove 23e of the zoom cam tube 23. Furthermore, the projecting portion 24g of the collapsible mount cam tube 50 does not reach the end of the notch 167 of the zoom cam tube 23. Accordingly, the zoom cam tube 23 cannot rotate with respect to the body, and the collapsible mount cam tube 24 comes to be in a state in which it can rotate with respect to the body.

Figure 10:
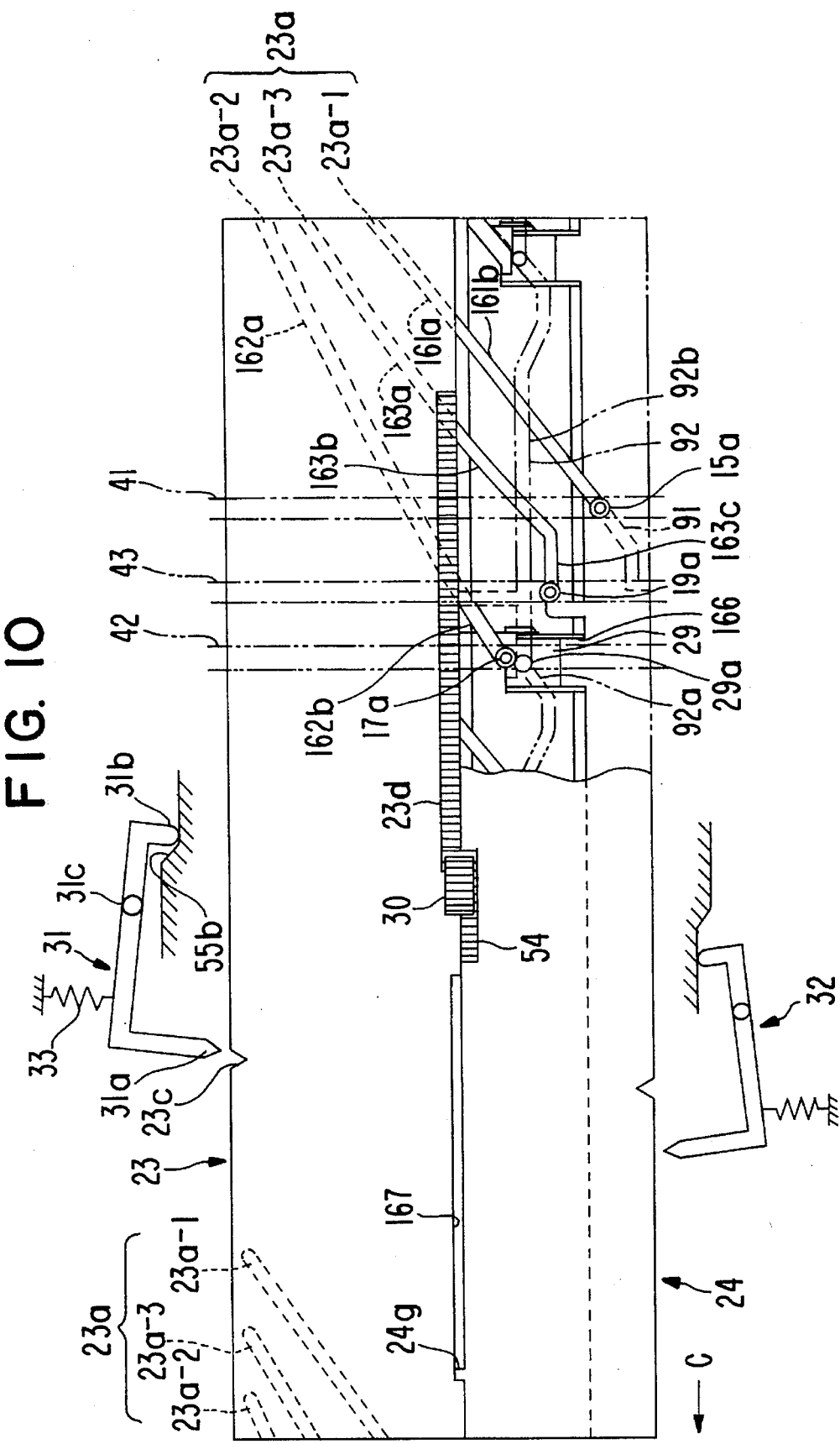
FIG. 10 is a developed diagram, seen from the outside, of the lens barrel during passage from the collapsed state of FIG. 9 to the Wide state.

In the collapsible mount region, the drive motor 52 drives and, as shown in FIG. 10, because the gear 30 cooperates only with the rack portion 24d of the collapsible mount cam tube 24, only the collapsible mount cam tube 24 rotates around the optical axis (the direction C in FIG. 10). By the rotation of this collapsible mount cam tube 24, the positions of the cam 92 formed in the collapsible mount cam tube 24 for lift piece use and the cam 92 also move relatively with respect to the body. By the movement of the cam 91, the follower pin 15a cooperates with the cam 91 such that movement may be in a direction having a directional component parallel to the optical axis 20. During this, the follower pin 15a, because its cylindrical portion 15a-1 cooperates with the rectilinear guide aperture 41 of the fixed tube 22, moves in a direction parallel to the optical axis 20. Due to this fact, the tube 15 begins to move in a direction parallel to the optical axis 20. Moreover, by the movement of the cam 92, the follower pin 29a of the lift piece 29, which cooperated with the oblique portion 92a of the cam 92, moves in a direction including a component in the direction parallel to the optical axis 20. However, the lift piece 29, via the lift member receiving portion 166 which is limited so as to move in a direction parallel to the optical axis 20, moves in a direction parallel to the optical axis 20. By the movement of the lift piece 29, the follower pin 17a which is placed in contact with the lift piece 29, also moves in a direction including a component in a direction parallel to the optical axis 20. During this, the follower pin 17a, because its cylindrical portion 17a-1 cooperates with the rectilinear guide aperture 42 of the fixed tube 22, moves in a direction parallel to the optical axis 20. Because of this, the shutter block 16, which supports the second lens group 12 and, also the anti-vibration unit 17, begins to move in a direction parallel to the optical axis 20.

Namely, in the collapsible mount region, when the drive motor 52 begins to drive, only the collapsible cam tube 24 rotates, and the first and second lens groups 11 and 12 move in a direction parallel to the optical axis. Moreover, the third lens group 13, because the follower pin 19a does not cooperate with the cam of the collapsible cam tube 24, does not move at all.

When the drive motor 52 drives further, the projecting portion 24g of the collapsible cam tube 23 comes into contact with the end of the notch 167 of the zoom cam tube 23, and the zoom cam tube 23 and the collapsible cam tube 23 begin to rotate together. At this time, the subject side end portion of the cam 91 of the collapsible cam tube 24, and the film side end of the 23a-1 of the zoom cam tube 23 coincide, and it is possible for the follower pin 15a to transfer from the cam 91 of the collapsible cam tube 24 to the cam 23a-1 of the zoom cam tube 23. Moreover, the stop portion 31a of the stop lever 31, which has restrained the rotation of the zoom cam tube 23 directly before this, becomes separated from the groove 23e and the zoom cam tube 23 also becomes in a state in which rotation is possible with respect to the body. This is because the operative portion 3 1b of the stop lever 31 moves from the high surface portion 24h-2 to the low surface portion 24h-1.

The projecting portion 24 of the collapsible cam tube 24 comes into contact with the end of the notch 167 of the zoom cam tube 23, wherein the zoom cam tube 23 and the collapsible cam tube 24 begin to rotate together. The drive motor 52 also comes to cooperate with the rack portion 23d of the zoom cam tube 23. At this time, the lift piece 29 becomes positioned in the side of the lift cam receiving portion 166 closest to the subject, and the follower pin 17a (which up to now was positioned within the lift cam receiving portion 166), which had come into contact with the lift piece 29, moves through cam 162b of the zoom cam tube 23. Moreover, by the zoom cam tube 23 beginning to rotate, the position of the cam groove 23a-3 formed in the zoom cam tube 23 also begins to move relatively with respect to the body. However, the follower pin 19a, because it is positioned in the perpendicular portion 163c of the cam groove 23a-3, even when the zoom cam tube 60 also begins to rotate, does not move at all. Moreover, the follower pin 15a, accompanying the movement of the cam groove 23a-3, advances further in a direction parallel to the optical axis 20, and comes to approach the zoom cam tube 23.

Figure 11:
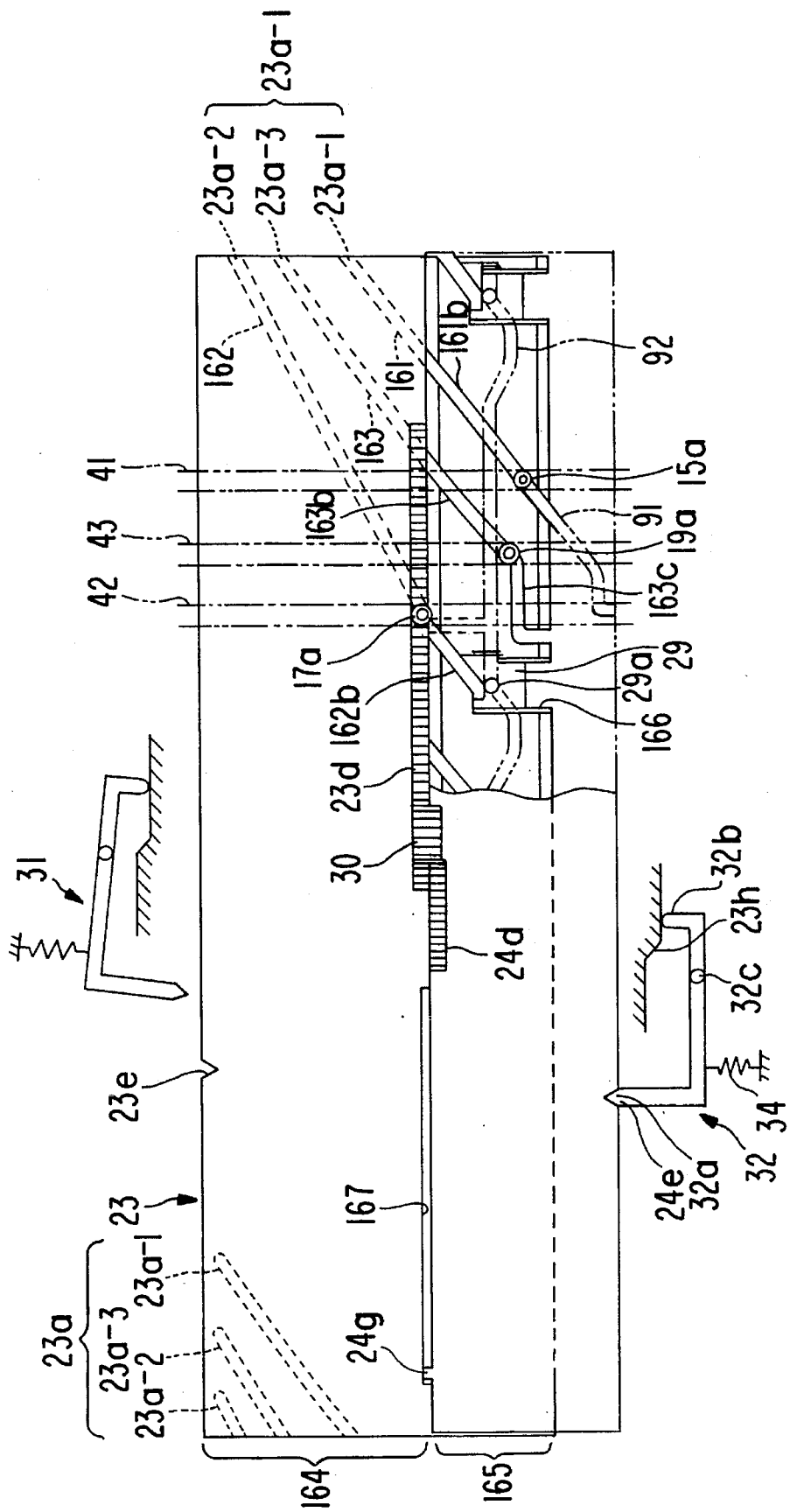
FIG. 11 is a developed diagram, seen from the outside, of the lens barrel which has reached the Wide state from the collapsed state of FIG. 9.

Then, furthermore, the drive motor 52 is driven, the zoom cam tube 23 and the collapsible cam tube 24 rotate, as shown in FIG. 2 and FIG. 11. The follower pin 15a moves down from the cam 91 of the collapsible mount cam tube 24 to the cam groove 23a-1 of the zoom cam tube 23. Moreover, the follower pin 17a moves from the through cam 162b of the through cam 165 of the zoom cam tube 23 to the interval cam 162a of the inner cam 164. Furthermore, the follower pin 19a moves from the perpendicular portion 163c of the cam groove 23a-3 to its oblique portion. Moreover, the drive gear 30, separating from the rack portion 24d of the collapsible cam tube 24, cooperates only with the rack portion 23d of the zoom cam tube 23. When this state arises, the drive motor 52 is stopped by a control device, not shown in the drawing. The Wide state is then reached in which it is possible to secure a minimum magnification in which photography is possible. Moreover, directly before this state arises, the stop portion 32a of the stop lever 32 is stopped in the groove 24e, thereby stopping the collapsible mount cam tube 24.

However, the projecting portion 24g of the collapsible cam tube 24g comes into contact with the end of the notch 167 of the zoom cam tube 23. Because the zoom cam tube 23 and the collapsible mount cam tube 24 begin to rotate together, numerous actions are performed in the interval up to the Wide position, and the rotation angle of the cam tubes 23 and 24 is such as to be large. But in actuality, the rotation angle of the cam tubes 23 and 24 of this interval is slight. Just before reaching the Wide position, the above numerous actions are performed.

Figure 12:
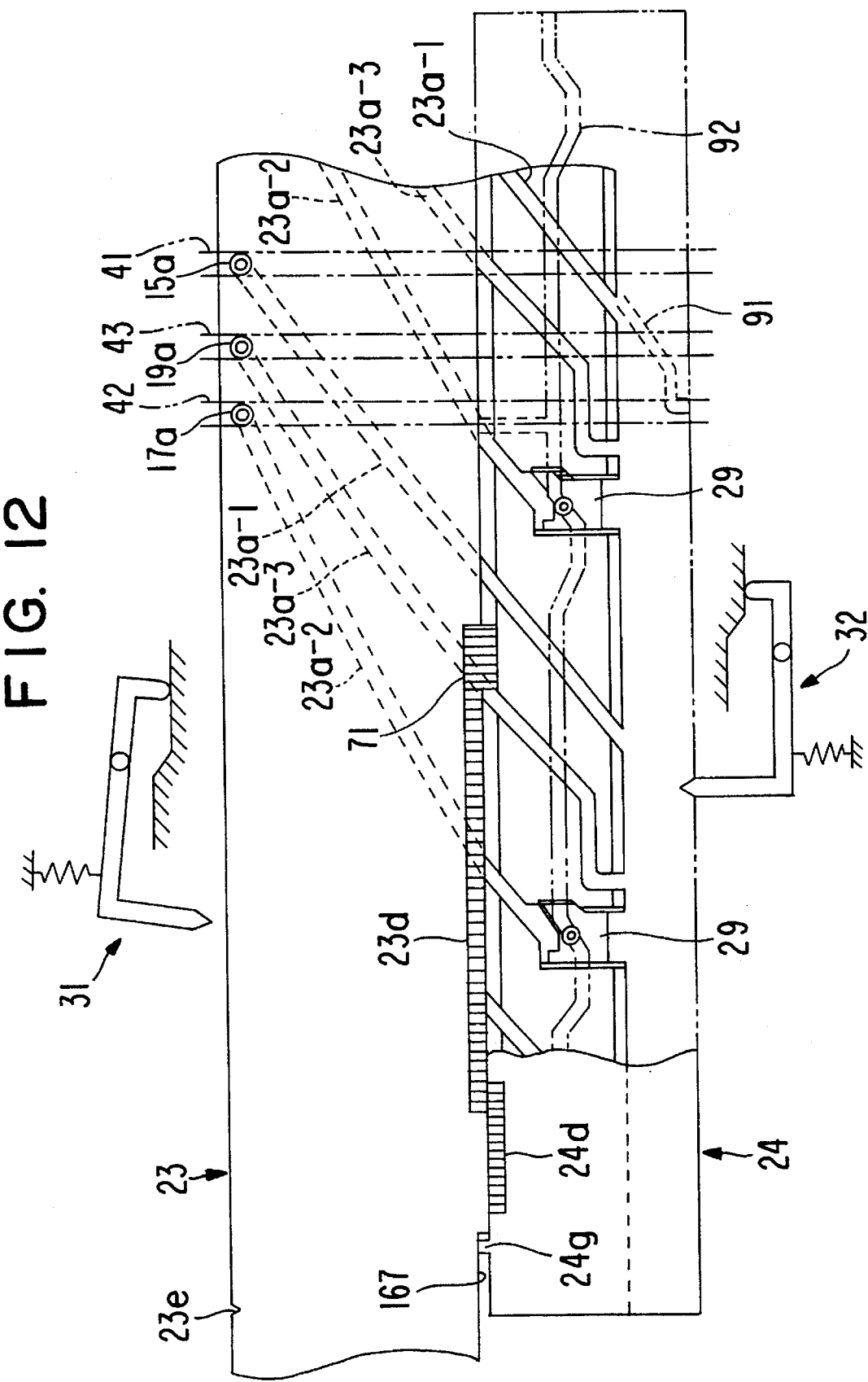
FIG. 12 is a developed diagram, seen from the outside, of the lens barrel which has reached the Tele state from the Wide state of FIG. 11.
Figure 13:
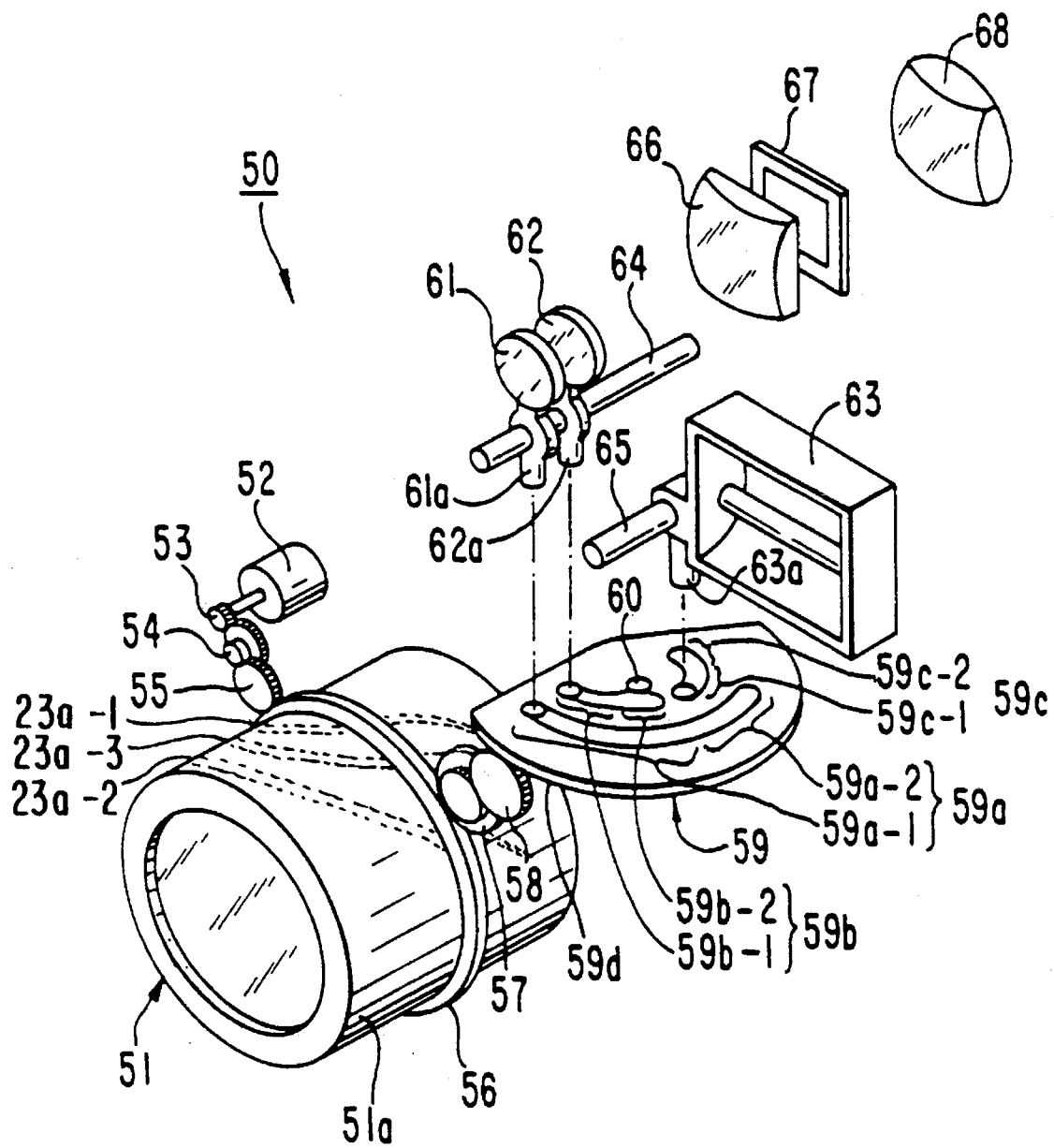
FIG. 13 is an oblique view showing a prior art collapsible mount type zoom camera.

In the focal length adjustment region, which is after reaching the Wide position, the drive motor 52 begins to be driven by an instruction of the control device. The drive gear 30, because it is cooperating with the rack portion 23d of the zoom cam tube 23, begins the rotation of only the zoom cam tube 23 by the drive of the drive motor 52. By this rotation of the zoom cam tube 23, the positions of the cam grooves 23a-1, 23a-2 and 23a-3, formed in the zoom cam tube 23, move relatively with respect to the body, and the follower pins 15a, 17a and 19a, which respectively cooperate with the cam grooves 23a-1, 23a-2 and 23a-3, move in a direction parallel to the optical axis 20. By the movement of these follower pins 15a, 17a and 19a, the support tube 15 which supports the first lens group 11, the shutter block 16 which supports the second lens group 12, and the focus unit 19 which supports the third lens group 13, move in the direction of the optical axis 20, becoming such that the photographer can obtain the desired magnification. Then, the focus unit 19 is driven and the helicoid ring 18 is caused to rotate. The third lens group 13, being caused to rotate around the optical axis, is moved a little in a direction parallel to the optical axis 20, and the focus is adjusted. In the case of obtaining the maximum magnification (the Tele position), as shown in FIG. 12, the follower pins 15a, 17a and 19a and the respective cam grooves 23a-1, 23a-2 and 23a-3 become positioned most on the side towards the subject, and the respective first through third lens groups 11, 12 and 13 also become positioned most on the side towards the subject. However, the follower pin 19a also positions the cam groove 23a-3 on the side most towards the subject, and it goes without saying that for focus adjustment, there is a case in which it is not positioned on the side most towards the subject by the drive of the focus unit 19.

Next, the extension action from the Wide position (state of minimum magnification) to the Tele position (state of maximum magnification) will be described. This extension action is fundamentally the same as the opposite action of this extension action as described above. However, the actions differ in only one point. The follower pin 17a cannot move to the film side during the extension action, even though the lift piece 29 moves. Consequently, in this case, as shown in FIG. 2, at the film side end portion the tube 10, the follower pin 17a presses the anti-vibration unit 17 towards the film side, and the follower pin 17a is caused to move towards the film side.

The variable magnification action of the viewfinder and light generating unit will be described using FIG. 8.

When the zoom cam tube 23 rotates, the magnification change and angle change gears 57, 58 and 111 rotate, cooperating with the rack portion 23d of the zoom cam tube 23. By the rotation of this gear group, 57, 58 and 111, the cam portion 69 rotates around the support portion 60 as the center. By the oscillation of the cam portion 69, the positions of the cam grooves 69a, 69b and 69c formed in the cam portion 69, move relatively with respect to the body, and the support shafts 61a and 62a of the viewfinder variable power lenses 61 and 62 and the cam support shaft 63a of the light generating unit 63 move in such a direction that it includes a component in the direction of the optical axis. During this time, the viewfinder variable power lenses 61 and 62 and the strobe body 131 move in a direction parallel to the optical axis, the viewfinder magnification and the strobe illumination angle become in correspondence with the photographic magnification.

Here, the rotation of the cam tubes 23 and 24 is simply arranged. The rack portion 24d of the collapsible cam tube 24 corresponds to the collapsible mount region. The rack portion 23d of the zoom cam tube 23 corresponds to the focal length adjustment region. Because of this, with respect to the rotation of the drive gear 30 cooperating with the rack portions 23d and 24d, in the collapsible mount region, only the collapsible cam tube 24 rotates. In the state just before the Wide position (the minimum magnification position), both the collapsible cam tube 24 and the zoom cam tube 23 rotate. Moreover, while in the focal length adjustment region (moving to the maximum magnification position, the Tele position, from the state of minimum magnification, the Wide position), only the zoom cam tube 24 rotates. Namely, the zoom cam tube 23 rotates from the Wide position (state of the minimum magnification position) until the Tele position (state of the maximum magnification position).

However, the variable power and variable angle mechanism 110 moves by the rotation of the zoom cam tube 23. Because of this, the viewfinder variable power lenses 61 and 62 and the strobe body 131 do not move from the collapsible mount position in which photography is impossible to the state of just before the Wide position (the minimum magnification position). They move from the state just before the Wide position (the minimum magnification position) up to the Tele position (the maximum magnification position). Accordingly, the range of movement of the viewfinder variable power lenses 61 and 62, and of the strobe body 131, or the range of oscillation of the cam portion 69 becomes small, and in addition, the length of each cam groove of the cam portion 69 becomes short, and the design can be for a smaller camera body.

In general, it is usual to arrange independent drive sources when respectively causing the two tubes 23 and 24 to rotate. Nevertheless, the rack portions 23d and 24d are formed on the external circumferences of the respective tubes 23 and 24. Also, collectively in the state of not causing the rotation of the respective rack portions 23d and 24d because the region of formation of the respective rack portions 23d and 24d is fixed, by causing the rotation by one drive source 52 of one drive gear 30 which cooperates with these rack portions 23d and 24d, the two tubes 23 and 24 can be rotated separately. Accordingly, by separating one cam tube into two, it is not necessary to have two drive sources, thus reducing the size of the camera.

Moreover, because two separated cam tubes are made mutually partially overlapping, the two cam tubes 23 and 24 can mutually screen light completely between the two cam tubes. Furthermore, because a cam tube rotation restriction mechanism 90 is arranged in the state in which the cam tube on one side is not rotated, and also the cam tube on the other side is set and stopped, the rotation of the cam tube on one side does not rotate the cam tube on the other side. When a follower pin 15a moves from the cam tube on one side to the cam tube on the other side, the rotational angular phase displacement of both cam tubes can be prevented.

Moreover, in this embodiment, because the inner cams 161a, 162a and 163a are formed with grooved bottoms, the rigidity of the zoom cam tube 23 is not greatly reduced. Even on making contact with the cam followers 15a, 17a and 19a, the internal cams 161a, 162a and 163a are scarcely deformed, and the cam followers 15a, 17a and 19a can be guided into accurate positions. On the other hand, by forming the through cam portion 164 of the zoom cam tube 23, and by having the collapsible mount cam tube 24 pressing on it from the outside, the rigidity here is not reduced significantly. The through cams 161b, 162b and 163b formed in the inner cam portion 164 are also not deformed significantly. In addition, because of the internal cam 91 formed in the collapsible mount cam tube 24, the follower pin is guided to an accurate position.

As discussed above, in general, it is usual to arrange independent drive sources which respectively cause the two cam tubes to rotate, but in the present invention, because the two cam tubes are caused to rotate by one drive source, a large size of the camera can be avoided.

By having the two cam portions mutually overlap, a leakage of light at the division point of the two cams can be avoided.

The present invention has been described hereinabove with reference to an embodiment of a collapsible mount type zoom camera, but the present invention is not limited to this embodiment, and various embodiments can be provided without departing from the principles and spirit of the present invention.

The photographic auxiliary units have been described as being the variable power lenses 61 and 62 of the viewfinder, and the light generating unit 63, but it is not necessary for all of these items to be made variable. When it is not necessary for the light generating unit 63 to be variable in dependence upon the focal length adjustment action of the lens barrel 1, the light generating unit 63 may be made fixed. The light generating unit 63 in this case is not a photographic auxiliary unit which is to be adjusted based upon the amount of movement of the photographic optical system in the present invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera having a photographic optical system movable in a first region and a second region, said camera comprising:

a drive unit to provide a drive force;

a photographic auxiliary unit which is movable based upon an amount of movement of the photographic optical system;

a first movement unit to move the photographic optical system;

a second movement unit to move the photographic auxiliary unit; and a drive force transmission unit to transmit the drive force to the first and second movement units while the photographic optical system is in the first region, and to transmit the drive force to the first movement unit, without transmitting the drive force to the second movement unit, while the photographic optical system is in the second region.

2. The camera as claimed in claim 1, wherein:

the first region is a range between a wide angle position and a telephoto position of the photographic optical system, such that focal length adjustment is performed to adjust magnification for a photograph; and the second region is a range between the wide angle position and a collapsed position of the photographic optical system.

3. The camera as claimed in claim 1, wherein:

the photographic optical system comprises;

a lens barrel with a plurality of lenses, a first lens of said plurality of lenses movable along an optical axis of the camera and between a minimum magnification position and a maximum magnification position, a lens support tube for supporting the first lens, a fixed tube arranged on an outer circumference of said lens support tube and not movable with respect a body of the camera, a collapsible mount cam tube arranged outside of said fixed tube and rotatable about the optical axis, and a zoom cam tube arranged adjacent to said collapsible mount cam tube at a side of said collapsible mount cam tube closer to a subject than film of the camera, said zoom cam tube rotatable about the optical axis; and said drive unit rotating said zoom cam tube without driving said collapsible mount cam tube while the photographic optical unit is in the first region, and said drive unit rotating said collapsible mount cam tube without driving said zoom cam tube while the photographic optical unit is in the second region.

4. The camera as claimed in claim 3, further comprising:

a follower projection formed in said lens support tube and projecting radially with respect to the optical axis;

a rectilinear guide portion formed in said fixed tube, receiving said follower projection to move the first lens from a collapsed position to a position for magnification;

a first spiral cam portion with an axis about the optical axis and formed in the zoom cam tube, to cooperate with the follower projection to move the first lens from in the first region;

a second spiral cam portion with an axis about the optical axis and formed in the collapsible mount cam tube, to cooperate with the follower projection to move the first lens in the second region;

a first rack gear portion formed circumferentially on a portion of an outer surface of said zoom cam tube;

a second rack gear portion formed circumferentially on a portion of an outer surface of said collapsible mount cam tube; and wherein said first rack gear engages said drive unit in the first region to drive said the first lens from a collapsed position of the minimum magnification position via said follower projection and said rectilinear guide portion and said second rack gear engages said drive unit in the second region to drive said the first lens from the minimum magnification position to the maximum magnification position via said follower projection and said rectilinear guide portion.

5. The camera as claimed in claim 3, wherein said zoom cam tube and said collapsible mount cam tube mutually overlap to prevent leakage of light from between said zoom cam tube and said collapsible mount cam tube.

6. The camera as claimed in claim 4, wherein said zoom cam tube and said collapsible mount cam tube mutually overlap to prevent leakage of light from between said zoom cam tube and said collapsible mount cam tube.

7. The camera as claimed in claim 3, wherein each of said first and second spiral cam portions has a groove bottom.

8. The camera as claimed in claim 3, further comprising a cam tube rotation restricting mechanism to restrict rotation of said collapsible mount cam tube in the first region and to restrict rotation of said zoom cam tube in the second region.

9. The camera as claimed in claim 5, further comprising a cam tube rotation restricting mechanism to restrict rotation of said collapsible mount cam tube in the first region and to restrict rotation of said zoom cam tube in the second region.

10. A camera comprising:

a photographic optical system having a first cam tube with a first rack portion and a second cam tube with a second rack portion, said photographic optical system being movable in a first region and a second region;

a drive unit to provide a drive force for moving the first cam tube without moving the second cam tube while said photographic optical system is in the first region, and for moving the second cam tube without moving the first cam tube while said photographic optical system is in the second region;

a member engaged with the first rack portion and disengaged with the second rack portion; and a photographic auxiliary unit connected to the member and which is movable based upon an amount of movement of said first cam tube.

11. The camera as claimed in claim 10, wherein:

the first region is a range between a wide angle position and a telephoto position of the photographic optical system, such that focal length adjustment is performed to adjust magnification for a photograph; and the second region is a range between the wide angle position and a collapsed position of the photographic optical system.

12. The camera as claimed in claim 10, wherein said photographic auxiliary unit is a light emitting device.

13. The camera as claimed in claim 10, wherein said photographic auxiliary unit is a variable power viewfinder lens system.

14. The camera as claimed in claim 11, further comprising:

the first cam tube including a first groove;

the second cam tube including a second groove;

a first engaging member to engage the first groove when the photographic optical system is at the collapsed position, stopping movement of the first cam tube; and a second engaging member to engage the second groove when the photographic optical system is at the wide angle position, stopping movement of the second cam tube.

15. The camera as claimed in claim 10, further comprising:

a drive gear continuously engaging said drive unit and alternately engaging the first and second rack portions to alternately transmit the drive force to the first and second cam tubes, respectively.

16. The camera as claimed in claim 15, wherein said member is a cam portion.

17. The camera as claimed in claim 16, wherein:

the first region is a range between a wide angle position and a telephoto position of the photographic optical system, such that focal length adjustment is performed to adjust magnification for a photograph; and the second region is a range between the wide angle position and a collapsed position of the photographic optical system.

18. The camera as claimed in claim 17, further comprising:

the first cam tube including a first groove;

the second cam tube including a second groove;

a first engaging member to engage the first groove when the photographic optical system is at the collapsed position, stopping movement of the first cam tube; and a second engaging member to engage the second groove when the photographic optical system is at the wide angle position, stopping movement of the second cam tube.

* * * * *